(12) United States Patent
Kamigaki et al.

(10) Patent No.: US 6,689,452 B2
(45) Date of Patent: Feb. 10, 2004

(54) MAGNETIC RECORDING MEDIUM

(75) Inventors: Mamoru Kamigaki, Hatsukaichi (JP); Seiji Ishitani, Hiroshima (JP); Hiroko Morii, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 7 days.

(21) Appl. No.: 10/128,569

(22) Filed: Apr. 24, 2002

(65) Prior Publication Data

US 2003/0031895 A1 Feb. 13, 2003

(30) Foreign Application Priority Data

Apr. 27, 2001 (JP) ........................................ 2001-133693

(51) Int. Cl.$^7$ ................................................ G11B 5/706
(52) U.S. Cl. ................ 428/323; 428/405; 428/694 BA; 428/694 BN; 428/694 BS
(58) Field of Search ................................. 428/323, 405, 428/694 BA, 694 BN, 694 BS

(56) References Cited

U.S. PATENT DOCUMENTS 6,294,242 B1    9/2001    Hayashi et al.
6,352,776 B1    3/2002    Hayashi et al.

FOREIGN PATENT DOCUMENTS

| EP | 0 359 511 A2 | 3/1990 |
| EP | 0 957 474 A1 | 11/1999 |
| EP | 0 982 715 A1 | 3/2000 |
| EP | 1 048 698 A1 | 11/2000 |
| EP | 1 074 980 A1 | 2/2001 |

*Primary Examiner*—Stevan A. Resan
(74) *Attorney, Agent, or Firm*—Nixon & Vanderhye P.C.

(57) ABSTRACT

A magnetic recording medium including a non-magnetic base film; and a magnetic recording layer formed on the non-magnetic base film. The magnetic recording layer contains a filler, a binder resin and surface-modified magnetic particles having an average particle diameter of 0.01 to 0.7 $\mu$m and contains magnetic particles and a silane monomer coat formed on surface of the magnetic particle by a dry-mixing method.

19 Claims, No Drawings

MAGNETIC RECORDING MEDIUM

BACKGROUND OF THE INVENTION

The present invention relates to a magnetic recording medium. More particularly, the present invention relates to a magnetic recording medium having a magnetic recording layer containing surface-modified magnetic particles and/or a surface-modified filler; and a magnetic recording medium having a non-magnetic undercoat layer containing surface-modified non-magnetic particles and a magnetic recording layer on the non-magnetic undercoat layer, containing at least one selected from the group consisting of surface-modified magnetic particles, a surface-modified filler and surface-modified non-magnetic particles, which are capable of inhibiting the production of a cyclohexanone dimer in a magnetic or non-magnetic coating composition upon the production of a magnetic recording medium.

In recent years, miniaturization, lightening, recording-time prolongation, high-density recording and increased memory capacity of magnetic recording and reproducing apparatuses for audio, video or computer, have proceeded more rapidly. With such recent developments, magnetic recording medium used in these apparatuses such as magnetic tapes and magnetic disks have also been required to have a high performance and a high-density recording property.

More specifically, the magnetic recording medium have been required to have a high image definition, a high image quality and high output characteristics, especially excellent frequency characteristics, as well as enhanced storage stability, durability and running property.

In general, the magnetic recording medium has been produced by applying a magnetic coating composition prepared by blending magnetic particles and a binder resin in an organic solvent, onto a non-magnetic base film.

However, it is known that when a ketone-based solvent, especially cyclohexanone, is used as the organic solvent, a cyclohexanone diner is inevitably produced because of high surface activity of the magnetic particles present in the magnetic coating composition. As a result, conventional magnetic recording medium produced by using such a magnetic coating composition containing cyclohexanone as the organic solvent, are unsatisfactory in strength of a magnetic coating film. As to this fact, Japanese Patent Application Laid-Open (KOKAI) No. 59-172562(1984) describes that " . . . There is a problem that a ketone-based solvent such as especially cyclohexanone tends to be dimerized during storage thereof. As a result, a magnetic layer produced by applying a coating composition containing such a solvent onto a base film tends to suffer from deteriorated strength or bleed-out . . . ".

For this reason, it has been required to provide magnetic particles and non-magnetic particles exhibiting improved surface properties capable of preventing the production of cyclohexanone dimer in magnetic and non-magnetic coating compositions.

On the other hand, magnetic recording medium have been required to exhibit a still higher performance and, therefore, have an improved strength of coating film as well as enhanced physical properties such as running property.

The running property of magnetic recording medium is ensured by incorporating a fatty acid such as myristic acid and stearic acid (hereinafter referred to merely as "fatty acid") in an amount of usually about 0.5 to about 5% by weight based on the weight of magnetic particles, into a magnetic recording layer generally formed as an upper layer of the magnetic recording medium, and then allowing the fatty acid to be gradually oozed onto the surface of the magnetic recording layer so as to cause the surface of the magnetic recording layer to be slidable.

When the amount of the fatty acid oozed out onto the surface of the magnetic recording layer is too small, it may be difficult to ensure a good running property of the magnetic recording medium. On the other hand, when a too large amount of the fatty acid is added to the magnetic recording layer so as to allow a large amount of the fatty acid to be oozed out onto the surface thereof, the fatty acid is preferentially adsorbed on the surface of the magnetic particles dispersed in the magnetic recording layer, so that the magnetic particles are inhibited from being absorbed in resin. As a result, it may be difficult to disperse the magnetic particles in vehicle resin. Further, an increased amount of the fatty acid as a non-magnetic component causes deterioration in magnetic properties of the magnetic recording medium. In addition, since the fatty acid acts as a plasticizer, there tend to arise additional problems such as deteriorated strength of the magnetic recording medium.

It is also known that magnetic or non-magnetic particles for magnetic recording medium are surface-treated with silane compounds in order to improve surface properties thereof (Japanese Patent Application Laid-Open (KOKAI) Nos. 51-134899(1976), 57-186302(1982), 59-172562 (1984), 5-1238(1993), 8-48910(1996) and 8-120118(1996) or the like).

At present, it has been strongly required to provide magnetic particles, filler and non-magnetic particles for magnetic recording medium which are capable of inhibiting the production of cyclohexanone diner in a magnetic or non-magnetic coating composition, and improving a running property of the obtained magnetic recording medium without deterioration in dispersibility thereof. However, magnetic particles, filler and non-magnetic particles for magnetic recording medium which can fulfill these requirements, have not been obtained conventionally.

That is, in Japanese Patent Application Laid-Open (KOKAI) Nos. 51-134899(1976), 57-186302(1982), 59-172562(1984), 5-1238(1993) and 8-48910(1996), it is described that magnetic particles or metal oxide particles are surface-treated with silane compounds. However, since all of the methods are directed to wet-treatment, it may be difficult to sufficiently inhibit the production of cyclohexanone dimer in a magnetic or non-magnetic coating composition and the obtained particles tend to be deteriorated in dispersibility in vehicle, as described in Comparative Examples below.

Also, in Japanese Patent Application Laid-Open (KOKAI) No. 8-120118(1996), it is described that an inorganic filler is heat-treated together with organometallic compounds at a temperature of not less than 200° C. However, it may be difficult to sufficiently inhibit the production of cyclohexanone dimer in a magnetic or non-magnetic coating composition and the obtained particles tend to be deteriorated in dispersibility in vehicle, as described in Comparative Examples below.

As a result of the present inventors earnest studies, it has been found that by using surface-modified particles obtained by dry-mixing raw particles to be treated with a silane monomer, e.g., mechanically mixing and stirring the raw particles with the silane monomer, or mechanically mixing and stirring the raw particles with the silane compound while spraying the silane compound thereon, a magnetic recording medium are free from the production of cyclohexanone dimer in a magnetic or non-magnetic coating composition, resulting in showing an excellent coating film strength and running durability. The present invention has been attained on the basis of this finding.

SUMMARY OF THE INVENTION

An object of the present invention is to provide a magnetic recording medium exhibiting excellent coating film strength and running durability, which is suitable as a high-density magnetic recording medium.

An another object of the present invention is to provide a magnetic recording medium containing surface-modified particles which are capable of not only inhibiting the production of cyclohexanone dimer in a magnetic or non-magnetic coating composition, but also showing an improved dispersibility in vehicle and a reduced fatty acid adsorption.

To accomplish the aims, in a first aspect of the present invention, there are provided a magnetic recording medium comprising:

a non-magnetic base film; and a magnetic recording layer formed on the non-magnetic base film, which contains a filler, a binder resin and surface-modified magnetic particles having an average particle diameter of 0.01 to 0.7 $\mu$m and comprising magnetic particles and an organosilane compound produced from a silane monomer, coated on surface of the magnetic particle by means of a dry-mixing method.

In a second aspect of the present invention, there is provided a magnetic recording medium comprising:

a non-magnetic base film; and a magnetic recording layer formed on the non-magnetic base film, which contains a binder resin, a surface-modified filler having an average particle diameter of 0.01 to 1.0 $\mu$m and comprising a filler and an organosilane compound produced from a silane monomer, coated on surface of the filler by means of a dry-mixing method, and surface-modified magnetic particles having an average particle diameter of 0.01 to 0.7 $\mu$m and comprising magnetic particles and an organosilane compound produced from a silane monomer, coated on surface of the magnetic particle by means of a dry-mixing method.

In a third aspect of the present invention, there is provided a magnetic recording medium comprising:

a non-magnetic base film;

a non-magnetic undercoat layer disposed on the surface of the non-magnetic base film, which contains a binder resin, and non-magnetic particles; and a magnetic recording layer formed on the non-magnetic undercoat layer, which contains a filler, a binder resin and surface-modified magnetic particles having an average particle diameter of 0.01 to 0.7 $\mu$m and comprising magnetic particles and an organosilane compound produced from a silane monomer, coated on surface of the magnetic particle by means of a dry-mixing method.

In a fourth aspect of the present invention, there is provided a magnetic recording medium comprising:

a non-magnetic base film;

a non-magnetic undercoat layer disposed on the surface of the non-magnetic base film, which contains a binder resin, and surface-modified non-magnetic particles having an average particle diameter of 0.01 to 0.5 $\mu$m and comprising acicular non-magnetic particles and an organosilane produced from a silane monomer, coated on surface of the acicular non-magnetic particles by means of a dry-mixing method; and a magnetic recording layer formed on the non-magnetic undercoat layer, which contains a filler, a binder resin and surface-modified magnetic particles having an average particle diameter of 0.01 to 0.7 $\mu$m and comprising magnetic particles and an organosilane compound produced from a silane monomer, coated on surface of the magnetic particle by means of a dry-mixing method.

In a fifth aspect of the present invention, there is provided a magnetic recording medium comprising:

a non-magnetic base film; and a magnetic recording layer formed on the non-magnetic base film, which contains magnetic particles, a binder resin, and a surface-modified filler having an average particle diameter of 0.01 to 1.0 $\mu$m and comprising a filler and an organosilane compound produced from a silane monomer, coated on the surface of the filler by means of a dry-mixing method.

In a sixth aspect of the present invention, there is provided a magnetic recording medium comprising:

a non-magnetic base film;

a non-magnetic undercoat layer disposed on the surface of the non-magnetic base film, which contains a binder resin and surface-modified non-magnetic particles having an average particle diameter of 0.01 to 0.5 $\mu$m and comprising acicular non-magnetic particles and an organosilane compound produced from a silane monomer, coated on surface of the acicular non-magnetic particle by means of a dry-mixing method; and a magnetic recording layer formed on the non-magnetic undercoat layer, which contains magnetic particles, a binder resin, and a surface-modified filler having an average particle diameter of 0.01 to 1.0 $\mu$m and comprising a filler and an organosilane compound produced from a silane monomer, coated on the surface of the filler by means of a dry-mixing method.

In a seventh aspect of the present invention, there is provided a magnetic recording medium comprising:

a non-magnetic base film;

a non-magnetic undercoat layer disposed on the surface of the non-magnetic base film, which contains a binder resin, and surface-modified non-magnetic particles having an average particle diameter of 0.01 to 0.5 $\mu$m and comprising acicular non-magnetic particles and organosilane compound produced from a silane monomer, coated on surface of the acicular non-magnetic particle by means of a dry-mixing method; and a magnetic recording layer formed on the non-magnetic undercoat layer, which contains a binder resin, a surface-modified filler having an average particle diameter of 0.01 to 1.0 $\mu$m and comprising a filler and an organosilane compound produced from a silane monomer, coated on surface of the filler by means of a dry-mixing method, and surface-modified magnetic particles having an average particle diameter of 0.01 to 0.7 $\mu$m and comprising magnetic particles and an organosilane compound produced from a silane monomer, coated on surface of the magnetic particle by means of a dry-mixing method.

DETAILED DESCRIPTION OF THE INVENTION

The present invention will be described in detail below.

The surface-modified particles used in the present invention comprise raw particles to be treated such as magnetic particles, filler or non-magnetic particles, and an organosilane compound produced from a silane monomer, coated onto the surface of these raw particles.

More specifically, the surface-modified particles used in the present invention are surface-modified magnetic particles, surface-modified filler or surface-modified non-magnetic particles, and are produced by dry-mixing the magnetic particles, filler or non-magnetic particles with the silane monomer (hereinafter, the surface-modified magnetic particles, the surface-modified filler or the surface-modified magnetic non-magnetic particles are totally referred to as "surface-modified particles", and the magnetic particles, filler or non-magnetic particles to be treated are totally referred to as "raw particles").

First, the surface-modified particles used in the present invention are described.

As the magnetic particles to be treated used in the present invention, there may be exemplified (i) magnetic acicular particles, e.g., cobalt-coated magnetic acicular iron oxide particles obtained by coating magnetic acicular iron oxide particles such as acicular magnetic particles ($\gamma$-$Fe_2O_3$) and acicular magnetite particles ($FeO_x \cdot Fe_2O_3$, $0<x \leq 1$) with Co, or Co and Fe; cobalt-coated magnetic acicular iron oxide particles obtained by incorporating elements other than Fe such as Co, Al, Ni, P, Zn, Si, B and rare earth metals into the above cobalt-coated magnetic acicular iron oxide particles; magnetic acicular metal particles containing iron as a main component; and magnetic acicular iron alloy particles containing elements other than Fe such as Co, Al, Ni, P, Zn, Si, B and rare earth metals; (ii) plate-shaped magnetic particles, e.g., plate-shaped magnetoplumbite-type ferrite particles containing Ba, Sr or Ba—Sr; and plate-shaped magnetoplumbite-type ferrite particles obtained by incorporating one or more coercive force reducing agents selected from the group consisting of divalent and tetravalent metals such as Co, Ni, Zn, Mn, Mg, Ti, Sn, Zr, Nb, Cu and Mo, into the above ferrite particles; and the like. Meanwhile, the magnetic particles used in the present invention may include either the acicular particles, the plate-shaped particles or both thereof unless otherwise specified. The acicular particles may include needle-like particles, spindle-shaped particles, rice ball-shaped particles or the like; plate-shaped particles.

In the consideration of the high-density recording of the magnetic recording medium, as the magnetic particles used as raw particles in the present invention, there are preferred magnetic acicular metal particles containing iron as a main component, and magnetic acicular iron alloy particles containing elements other than Fe such as Co, Al, Ni, P, Zn, Si, B and rare earth metals.

Specifically, the magnetic acicular iron-based alloy particles comprising (i) iron and Al; (ii) iron, Co and Al; (iii) iron, Al and at least one rare-earth metal such as Nd, La and Y, or (iv) iron, Co, Al and at least one rare-earth metal such as Nd, La and Y is more preferable from the point of the durability of the magnetic recording medium. The amount of cobalt contained in the magnetic particles is usually 0.5 to 50 atomic % (calculated as Co); the amount of aluminum contained in the magnetic particles is usually 0.5 to 30 atomic % (calculated as Al); the amount of rare earth metals contained in the magnetic particles is usually 0.5 to 30 atomic % (calculated as the rare earth element).

More specifically, the magnetic acicular iron-based alloy particles may be exemplified as follows.

1) Magnetic acicular iron-based alloy particles comprises iron; and cobalt of usually 0.05 to 40% by weight, preferably 1.0 to 35% by weight, more preferably 3 to 30% by weight (calculated as Co) based on the weight of the magnetic acicular iron-based alloy particles.

2) Magnetic acicular iron-based alloy particles comprise iron; and aluminum of usually 0.05 to 10% by weight, preferably 0.1 to 7% by weight (calculated as Al) based on the weight of the magnetic acicular iron-based alloy particles.

3) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and aluminum of usually 0.05 to 10% by weight, preferably 0.1 to 7% by weight (calculated as Al) based on the weight of the magnetic acicular iron-based alloy particles.

4) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

5) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

6) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

7) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and at least one selected from the group consisting of Ni, P, Si, Zn, fi, Cu and B of usually 0.05 to 10% by weight, preferably 0.1 to 7% by weight (calculated as the corresponding element) based on the weight of the magnetic acicular iron-based alloy particles.

8) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

9) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

10) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; at least one selected from the group consisting of Nd, La and Y of usually 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

11) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; at least one selected from the group consisting of Nd, La and Y of ordinarily 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

12) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; at least one selected from the group consisting of Nd, La and Y of usually 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

The iron content in the particles is the balance, and is preferably 50 to 99% by weight, more preferably 60 to 95% by weight (calculated as Fe) based on the weight of the magnetic acicular metal particles containing iron as a main component or the magnetic acicular iron-based alloy particles.

The acicular magnetic particles as the raw particles have an average particle diameter (average major axis diameter) of usually 0.01 to 0.70 μm, preferably 0.02 to 0.60 μm, more preferably 0.03 to 0.50 μm; and an aspect ratio (ratio of average major axis diameter to average minor axis diameter; hereinafter referred to merely as "aspect ratio") of preferably 2.0:1 to 20.0:1, more preferably 2.5:1 to 18.0:1, still more preferably 3.0:1 to 15.0:1.

The plate-shaped magnetic particles as the raw particles have an average particle diameter (average plate surface diameter) of usually 0.01 to 0.20 μm, preferably 0.02 to 0.20 μm, more preferably 0.03 to 0.20 μm; and an plate ratio (ratio of average plate surface diameter to average thickness; hereinafter referred to merely as "plate ratio") of preferably 2.0:1 to 20.0:1, more preferably 2.5:1 to 15.0:1, still more preferably 3.0:1 to 10.0:1.

The magnetic particles as the raw particles have a geometrical standard deviation value of particle diameter of preferably not more than 2.00, more preferably not more than 1.90, still more preferably not more than 1.80; and a BET specific surface area value of preferably 15 to 200 m$^2$/g, more preferably 20 to 150 m$^2$/g, still more preferably 25 to 100 m$^2$/g.

The magnetic particles as the raw particles have a cyclohexanone dimer production activity of usually 10 to 500 mg/g; a resin adsorption of usually not more than 60%; and a fatty acid adsorption of usually 18 to 50 mg/g.

As to magnetic properties of the magnetic particles as the raw particles, the coercive force value thereof is preferably 39.8 to 318.3 kA/m (500 to 4,000 Oe), more preferably 43.8 to 318.3 kA/m (550 to 4,000 Oe); and the saturation magnetization value thereof is preferably 35 to 170 Am$^2$/kg (35 to 170 emu/g), more preferably 40 to 170 Am$^2$/kg (40 to 170 emu/g).

More specifically, in the case where the magnetic particles as the raw particles are cobalt-coated acicular magnetic iron oxide particles, the coercive force value thereof is preferably 39.8 to 135.3 kA/m (500 to 1,700 Oe); and the saturation magnetization value thereof is preferably 60 to 90 Am$^2$/kg (60 to 90 emu/g). In the case where the magnetic particles as the raw particles are magnetic acicular metal particles containing iron as a main component or magnetic acicular iron alloy particles, the coercive force value thereof is preferably 63.7 to 278.5 kA/m (800 to 3,500 Oe); and the saturation magnetization value thereof is preferably 90 to 170 Am$^2$/kg (90 to 170 emu/g). In the case where the magnetic particles as the raw particles are plate-shaped magnetoplumbite-type magnetic particles, the coercive force value thereof is preferably 39.8 to 318.3 kA/m (500 to 4,000 Oe); and the saturation magnetization value thereof is preferably 35 to 70 Am$^2$/kg (35 to 70 emu/g).

The organosilane compound is a compound produced from the silane monomer. As the silane monomer, there may be exemplified an alkoxysilane represented by the formula (I):

$$R^1_a SiX_{4-a} \tag{I}$$

wherein $R^1$ is $C_6H_5-$, $(CH_3)_2CHCH_2-$ or n-$C_bH_{2b+1}-$ (wherein b is an integer of 1 to 18); X is $CH_3O-$ or $C_2H_5O-$; and a is an integer of 0 to 3.

Examples of the alkoxysilane may include methyltriethoxysilane, dimethyldiethoxysilane, phenyltriethoxysilane, diphenyldiethoxysilane, dimethyldimethoxysilane, methyltirmethoxysilane, phenyltrimethoxysilane, diphenyldimethoxysilane, isobutyltrimethoxysilane, decyltrimethoxysilane or the like.

Among these silane monomers, in the consideration of good coating effect onto the raw particles, methyltriethoxysilane, methyltirmethoxysilane, dimethyldimethoxysilane, isobutyltrimethoxysilane and phenyltriethoxysilane are preferred, and methyltriethoxysilane, methyltirmethoxysilane and phenyltriethoxysilane are more preferred.

When the acicular magnetic particles are used as the raw particles, the obtained surface-modified magnetic particles used in the present invention have an average particle diameter (average major axis diameter) of usually 0.01 to 0.70 μm, preferably 0.02 to 0.60 μm, more preferably 0.03 to 0.50 μm; and an aspect ratio of preferably 2.0:1 to 20.0:1, more preferably 2.5:1 to 18.0:1, still more preferably 3.0:1 to 15.0:1.

When the average particle diameter of the surface-modified magnetic particles produced by using the acicular magnetic particles as the raw particles, is more than 0.70 μm, the obtained surface-modified magnetic particles become coarse, so that a magnetic recording layer formed by using such coarse surface-modified magnetic particles tends to be deteriorated in surface smoothness. On the other hand, when the average major axis diameter of the surface-modified magnetic particles is less than 0.01 μm, such particles tend to be agglomerated together because of the increase of the intermolecular force therebetween due to fine particles, resulting in poor dispersibility in vehicle upon production of a magnetic coating composition.

When the aspect ratio of the surface-modified magnetic particles produced by using the acicular magnetic particles as the raw particles is more than 20.0:1, such particles tend to be entangled together, resulting in poor dispersibility in vehicle as well as increased viscosity upon production of a magnetic coating composition. When the aspect ratio is less than 2.0:1, the obtained magnetic recording medium tends to be deteriorated in coating film strength.

When the plate-shaped magnetic particles are used as the raw particles, the obtained surface-modified magnetic particles used in the present invention have an average particle diameter (average plate surface diameter) of usually 0.01 to 0.20 μm, preferably 0.02 to 0.20 μm, more preferably 0.03 to 0.20 μm; and a plate ratio of preferably 2.0:1 to 20.0:1, more preferably 2.5:1 to 15.0:1, still more preferably 3.0:1 to 10.0:1.

When the average particle diameter of the surface-modified magnetic particles produced by using the plate-shaped magnetic particles as the raw particles, is more than 0.20 μm, the obtained surface-modified magnetic particles become coarse, so that a magnetic recording layer formed by using such coarse surface-modified magnetic particles tends to be deteriorated in surface smoothness. On the other hand, when the average particle diameter of the surface-modified magnetic particles is less than 0.01 μm, such particles tend to be agglomerated together because of the increase of the intermolecular force therebetween due to fine particles, resulting in poor dispersibility in vehicle upon production of a magnetic coating composition.

When the plate ratio of the surface-modified magnetic particles produced by using the plate-shaped magnetic particles is more than 20.0:1, such particles tend to suffer from stacking, resulting in poor dispersibility in vehicle as well as increased viscosity upon production of a magnetic coating composition. When the plate ratio is less than 2.0:1, the obtained magnetic recording medium tends to be deteriorated in coating film strength.

The surface-modified magnetic particles have a geometrical standard deviation value of particle diameters of preferably not more than 2.00. When the geometrical standard deviation value is more than 2.00, the obtained coating film tends to be deteriorated in surface smoothness because of existence of coarse particles. In the consideration of good surface smoothness of the obtained coating film, the geometrical standard deviation value of the surface-modified magnetic particles is more preferably not more than 1.90, still more preferably not more than 1.80. In the consideration of industrial productivity, the lower limit of the geometrical standard deviation value of particle diameters of the surface-modified magnetic particles is 1.01. Namely, it may be difficult to industrially produce such particles having a geometrical standard deviation value of less than 1.01.

The surface-modified magnetic particles have a BET specific surface area value of preferably 15 to 200 $m^2/g$, more preferably 20 to 150 $m^2/g$, still more preferably 25 to 100 $m^2/g$. When the BET specific surface area value is less than 15 $m^2/g$, the obtained surface-modified magnetic particles become coarse, or suffer from sintering therebetween, so that a magnetic recording layer produced by using such particles tends to be deteriorated in surface smoothness. When the BET specific surface area value is more than 200 $m^2/g$, such particles tend to be agglomerated together by the increase of intermolecular force therebetween due to fine particles, resulting in poor dispersibility in vehicle upon production of a magnetic coating composition.

The surface-modified magnetic particles used in the present invention exhibit a cyclohexanone dimer production activity of usually not more than 50 mg/g, preferably not more than 40 mg/g. When the cyclohexanone dimer production activity is more than 50 mg/g, the obtained magnetic recording medium tends to be deteriorated in strength.

The surface-modified magnetic particles used in the present invention have a resin adsorption of usually not less than 70%, preferably not less than 72%, more preferably not less than 74%.

The surface-modified magnetic particles used in the present invention have a fatty acid adsorption of usually not more than 16 mg/g, preferably 0.5 to 15 mg/g. When the fatty acid adsorption is more than 16 mg/g, the amount of fatty acid absorbed onto the surface-modified magnetic particles becomes large, resulting in increased amount of the fatty acid oozed out onto the surface of the magnetic recording layer. As a result, it may be difficult to ensure a good running property of the obtained magnetic recording medium.

The surface-modified magnetic particles used in the present invention can still maintain the above magnetic properties of the magnetic particles as the raw particles. More specifically, the surface-modified magnetic particles used in the present invention have a coercive force value of preferably 39.8 to 318.3 kA/m (500 to 4,000 Oe), more preferably 43.8 to 318.3 kA/m (550 to 4,000 Oe); and a saturation magnetization value of preferably 35 to 170 $AM^2/kg$ (35 to 170 emu/g), more preferably 40 to 170 $Am^2/kg$ (40 to 170 emu/g).

In the surface-modified magnetic particles, the amount of the organosilane compound produced from the silane monomer onto the raw particles is usually 0.04 to 15% by weight, preferably 0.06 to 10% by weight, more preferably 0.08 to 5% by weight (calculated as Si) based on the weight of the surface-modified magnetic particles. When the amount of the organosilane compound produced from the silane monomer is less than 0.04% by weight, it may be difficult to inhibit the production of cyclohexanone dimer. When the amount of the organosilane compound produced from the silane monomer is more than 15% by weight, since the effect of inhibiting the production of cyclohexanone dimer is already saturated, it is unnecessary and meaningless to coat the raw particles with such a large amount of the organosilane compound produced from the silane monomer.

Next, the surface-modified filler used in the present invention is described.

Examples of the filler used as the raw particles in the present invention may include particles of hematite, alumina, zirconium oxide, cerium oxide, chromium oxide or the like.

The filler as the raw particles may have various shapes. For example, there may be used granular particles having a spherical shape, a granular shape, an octahedral shape, a hexahedral shape, a polyhedral shape or the like; or acicular particles having an acicular shape, a spindle shape, a rice-ball shape or the like. Among these particles, in the consideration of dispersibility in vehicle, granular particles are preferred.

As to the particle size of the filler as the raw particles, in case of granular particles, the average particle diameter thereof is usually 0.01 to 1.0 μm, preferably 0.02 to 0.90 μm, more preferably 0.03 to 0.80 μm.

In case of acicular particles, the average particle diameter (average major axis diameter) thereof is usually 0.01 to 1.00 μm, preferably 0.02 to 0.90 μm, more preferably 0.03 to 0.80 μm, and the aspect ratio thereof is usually 2.0:1 to 20.0:1, preferably 2.5:1 to 15.0:1, more preferably 3.0:1 to 10.0:1.

The filler as the raw particles has a geometrical standard deviation value of particle diameters of preferably not more than 1.80, more preferably not more than 1.70, still more preferably not more than 1.60; and a BET specific surface area value of preferably 1.0 to 200 $m^2/g$, more preferably 1.5 to 150 $m^2/g$, still more preferably 2.0 to 100 $m^2/g$.

The filler as the raw particles has a cyclohexanone dimer production activity of usually 50 to 150 mg/g; a resin adsorption of usually not more than 60%; and a fatty acid adsorption of usually 8 to 50 mg/g.

As to the particle size of the surface-modified filler used in the present invention, the average particle diameter thereof is usually 0.01 to 1.0 μm, preferably 0.02 to 0.9 μm, more preferably 0.03 to 0.8 μm.

More specifically, when the granular filler is used as the raw particle, the obtained surface-modified filler has an average particle diameter of usually 0.01 to 1.0 μm, preferably 0.02 to 0.9 μm, more preferably 0.03 to 0.8 μm.

When the acicular filler is used as the raw particles, the obtained surface-modified filler has an average particle diameter (average major axis diameter) of usually 0.01 to 1.0 μm, preferably 0.02 to 0.9 μm, more preferably 0.03 to 0.8 μm; and an aspect ratio of usually 2.0:1 to 20.0:1, preferably 2.5:1 to 15.0:1, more preferably 3.0:1 to 10.0:1.

When the average particle diameter of the surface-modified filler is less than 0.01 μm, such particles tend to be agglomerated together because of the increase of intermolecular force therebetween due to fine particles, resulting in poor dispersibility in vehicle upon production of a magnetic coating composition. As a result, the obtained magnetic recording medium tends to be deteriorated in durability and surface smoothness. On the other hand, when the average particle diameter of the surface-modified filler is more than 1.0 μm, the obtained surface-modified filler has a too large particle size, so that a magnetic recording layer formed by using such a large surface-modified filler tends to be deteriorated in surface smoothness.

When the aspect ratio of the surface-modified filler having an acicular particle shape is more than 20.0:1, such particles tend to be entangled together, so that it may be difficult to uniformly disperse the surface-modified filler in vehicle upon the production of a magnetic coating composition. As a result, it may also be difficult to obtain a magnetic recording medium exhibiting excellent durability and surface smoothness.

The surface-modified filler has a geometrical standard deviation value of particle diameters of preferably not more than 1.80. When the geometrical standard deviation value is more than 1.80, the surface smoothness of a coating film formed by using such a surface-modified filler tends to be deteriorated because of existence of coarse particles. In the consideration of good surface smoothness of the obtained coating film, the geometrical standard deviation value of the surface-modified filler is more preferably not more than 1.70, still more preferably not more than 1.60. In the consideration of industrial productivity, the lower limit of the geometrical standard deviation value of particle diameters of the surface-modified filler is 1.01. Namely, it may be difficult to industrially produce such a filler having a geometrical standard deviation value of less than 1.01.

The surface-modified filler has a BET specific surface area value of preferably 1 to 200 $m^2/g$, more preferably 1.5 to 150 $m^2/g$, still more preferably 2 to 100 $m^2/g$. When the BET specific surface area value is less than 1 $m^2/g$, the obtained surface-modified filler may become coarse, or may suffer from sintering therebetween, so that a magnetic recording medium produced by using such a filler tends to be deteriorated in surface smoothness of a coating film. When the BET specific surface area value is more than 200 $m^2/g$, such a filler tends to be agglomerated together by the increase of intermolecular force therebetween due to fine particles, resulting in poor dispersibility in vehicle upon production of a magnetic coating composition.

The surface-modified filler used in the present invention exhibits a cyclohexanone diner production activity of usually not more than 40 mg/g, preferably not more than 30 mg/g.

The surface-modified filler used in the present invention has a resin adsorption of usually not less than 70%, preferably not less than 72%, more preferably not less than 74%.

The surface-modified filler used in the present invention has a fatty acid adsorption of usually not more than 7 mg/g, preferably 0.5 to 6 mg/g.

In the surface-modified filler used in the present invention, the amount of the organosilane compound produced from the silane monomer onto the filler as the raw particles is usually 0.04 to 15% by weight, preferably 0.06 to 10% by weight, more preferably 0.08 to 5% by weight (calculated as Si) based on the weight of the obtained surface-modified filler. When the amount of the organosilane compound produced from the silane monomer is less than 0.04% by weight, it may be difficult to inhibit the production of cyclohexanone diner. When the amount of organosilane compound produced from the silane monomer is more than 15% by weight, since the effect of inhibiting the production of cyclohexanone dimer is already saturated, it is unnecessary and meaningless to coat the filler with such a large amount of the organosilane compound produced from the silane monomer.

Next, the surface-modified non-magnetic particles used in the present invention are described.

Specific examples of the non-magnetic particles may include hematite particles, iron oxide hydroxide particles, titanium oxide particles, zinc oxide particles, tin oxide particles, tungsten oxide particles, silicon dioxide particles, α-alumina particles, β-alumina particles, γ-alumina particles, chromium oxide particles, cerium oxide particles, silicon carbide particles, titanium carbide particles, silicon nitride particles, boron nitride particles, calcium carbonate particles, barium carbonate particles, magnesium carbonate particles, strontium carbonate particles, calcium sulfate particles, barium sulfate particles, molybdenum disulfide particles, barium titanate particles or the like. These non-magnetic particles may be used alone or in combination of any two or more thereof. Among these non-magnetic particles, hematite particles, iron oxide hydroxide particles and titanium oxide particles, etc., are preferred.

The non-magnetic particles as the raw particles have an acicular shape. The "acicular" shape used herein is intended to involve in addition to literally an acicular shape, a spindle shape, a rice-grain shape or the like.

The non-magnetic particles as the raw particles have an average major axis diameter of usually 0.01 to 0.50 µm, preferably 0.02 to 0.40 µm, more preferably 0.03 to 0.30 µm; an aspect ratio of usually 2.0:1 to 20.0:1, preferably 2.5:1 to 18.0:1, more preferably 3.0:1 to 15.0:1; a geometrical standard deviation value of particle diameters of preferably not more than 1.50, more preferably not more than 1.48, still more preferably not more than 1.45; and a BET specific surface area value of preferably 35 to 250 $m^2/g$, more preferably 38 to 200 $m^2/g$, still more preferably 40 to 180 $m^2/g$.

The non-magnetic particles as the raw particles have a cyclohexanone dimer production activity of usually 150 to 300 mg/g; a resin adsorption of usually not more than 60%; and a fatty acid adsorption of usually 16 to 60 mg/g.

The surface-modified non-magnetic particles used in the present invention have an average major axis diameter of usually 0.01 to 0.50 µm, preferably 0.02 to 0.40 µm, more preferably 0.03 to 0.30 µm.

When the average major axis diameter is more than 0.50 µm, the obtained surface-modified non-magnetic particles become coarse, so that the non-magnetic undercoat layer formed by using such coarse surface-modified non-magnetic particles tends to be deteriorated in surface smoothness. On the other hand, when the average particle diameter is less than 0.01 µm, such particles tend to be agglomerated together because of the increase of intermolecular force therebetween due to fine particles, resulting in poor dispersibility in vehicle upon production of a non-magnetic coating composition.

The surface-modified non-magnetic particles used in the present invention have an aspect ratio of usually 2.0:1 to 20.0:1, preferably 2.5:1 to 18.0:1, more preferably 3.0:1 to 15.0:1.

When the aspect ratio of the surface-modified non-magnetic particles is more than 20.0:1, such particles tend to be entangled together, resulting in poor dispersibility in vehicle as well as increased viscosity upon the production of a non-magnetic coating composition. When the aspect ratio of the surface-modified non-magnetic particles is less than 2.0:1, the non-magnetic undercoat layer formed by using such surface-modified non-magnetic particles tends to be deteriorated in strength.

The surface-modified non-magnetic particles have a geometrical standard deviation value of particle diameters of preferably not more than 1.50. When the geometrical standard deviation value is more than 1.50, the coating film formed by using such surface-modified non-magnetic particles tends to be deteriorated in surface smoothness because of existence of coarse particles. In the consideration of good surface smoothness of the obtained coating film, the geometrical standard deviation value of particle diameters of the surface-modified non-magnetic particles is more preferably not more than 1.48, still more preferably not more than 1.45. In the consideration of industrial productivity, the lower limit of the geometrical standard deviation value of particle diameters of the surface-modified non-magnetic particles is 1.01. Namely, it may be difficult to industrially produce such surface-modified non-magnetic particles having a geometrical standard deviation value of less than 1.01.

The surface-modified non-magnetic particles have a BET specific surface area value of preferably 35 to 250 $m^2/g$, more preferably 38 to 200 $m^2/g$, still more preferably 40 to 180 $m^2/g$. When the BET specific surface area value is less than 35 $m^2/g$, the obtained surface-modified non-magnetic particles become coarse, or suffer from sintering therebetween, so that the non-magnetic undercoat layer formed by using such surface-modified non-magnetic particles tends to be deteriorated in surface smoothness. When the BET specific surface area value is more than 250 $m^2/g$, such non-magnetic particles tend to be agglomerated together by the increase of intermolecular force therebetween due to fine particles, resulting in poor dispersibility in vehicle upon production of a non-magnetic coating composition.

The surface-modified non-magnetic particles used in the present invention have a cyclohexanone dimer production activity of usually not more than 50 mg/g, preferably not more than 40 mg/g. When the cyclohexanone dimer production activity of the surface-modified non-magnetic particles is more than 50 mg/g, the obtained magnetic recording medium tends to be deteriorated in strength.

The surface-modified non-magnetic particles used in the present invention have a resin adsorption of usually not less than 70%, preferably not less than 72%, more preferably not less than 74%.

The surface-modified non-magnetic particles used in the present invention have a fatty acid adsorption of usually not more than 15 mg/g, preferably 0.5 to 10 mg/g.

When the fatty acid adsorption is less than 0.5 mg/g, it may be difficult to adequately control the amount of the fatty acid oozed out onto the surface of the magnetic recording layer because of a too small amount of the fatty acid absorbed into the surface-modified non-magnetic particles, thereby failing to obtain magnetic recording medium having a sufficient running property. When the fatty acid adsorption is more than 15 mg/g, the amount of the fatty acid oozed out onto the surface of the magnetic recording layer becomes too small since a large amount of the fatty acid is absorbed into the surface-modified non-magnetic particles, so that it may be difficult to ensure a good running property of the obtained magnetic recording medium.

In the surface-modified non-magnetic particles, the amount of the organosilane compound produced from the silane monomer onto the raw particles is usually 0.04 to 15% by weight, preferably 0.06 to 10% by weight, more preferably 0.08 to 5% by weight (calculated as Si) based on the weight of the surface-modified non-magnetic particles.

When the amount of the organosilane compound produced from the silane monomer is less than 0.04% by weight, it may be difficult to inhibit the production of cyclohexanone dimer. It is unnecessary and meaningless to adhere the organosilane compound produced from the silane monomer in an amount of more than 15% by weight since the effect of inhibiting the production of cyclohexanone dimer is already saturated.

Upon the production of the surface-modified particles used in the present invention, the surface of the raw particles may be previously coated, if required, with at least one coating material selected from the group consisting of hydroxides of aluminum, oxides of aluminum, hydroxides of silicon and oxides of silicon. The surface-modified particles produced by using such coated raw particles can exhibit a more excellent dispersibility in vehicle as compared to those produced by using uncoated raw particles.

The total amount of the coating material disposed between the surface of the raw particles and the organosilane compound layer is preferably 0.01 to 20% by weight (calculated as Al, $SiO_2$ or a sum of Al and $SiO_2$) based on the weight of the coated raw particles.

When the amount of the coating material is less than 0.01% by weight, it may be difficult to obtain the effect of enhancing the dispersibility. Since the amount of the coating material up to 20% by weight is sufficient to attain the effect of enhancing the dispersibility, it is unnecessary and meaningless to coat the raw particles with the coating material in an amount of more than 20% by weight.

The surface-modified particles produced by using the raw particles coated with the coating material, have the substantially same particle size, geometrical standard deviation value, BET specific surface area value, magnetic properties, cyclohexanone dimer production ability and fatty acid adsorption as those of the surface-modified particles produced by using uncoated raw particles according to the present invention.

The surface-modified particles can also be enhanced in resin adsorption by coating the surface of the raw particles with the above coating material. More specifically, the surface-modified particles produced by using the coated raw particles can exhibit a resin adsorption of preferably not less than 74%, more preferably not less than 76%.

Next, the magnetic recording medium of the present invention is described.

The magnetic recording medium of the present invention comprises a non-magnetic base film, and a magnetic recording layer formed on the non-magnetic base film, which contains the surface-modified magnetic particles, an ordinary filler (i.e., surface-unmodified filler; hereinafter referred to merely as "ordinary filler") and a binder resin, or contains magnetic particles, the surface-modified filler and a binder resin. In addition, when the surface-modified magnetic particles are used together with the surface-modified filler, the obtained magnetic recording medium can exhibit a more excellent effect of inhibiting the production of cyclohexanone dimer.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 $\mu$m, preferably 2.0 to 200 $\mu$m.

In the case of a magnetic disc, polyethylene terephtalate is usually used as the non-magnetic base film. The thickness thereof is usually 50 to 300 $\mu$m, preferably 60 to 200 $\mu$m. In the case of a magnetic tape, when polyethylene terephthalate is used as the base film, the thickness thereof is usually 3 to 100 $\mu$m, preferably 4 to 20 $\mu$m. When polyethylene naphthalate is used, the thickness thereof is usually 3 to 50 $\mu$m preferably 4 to 20 $\mu$m. When polyamide is used, the thickness thereof is usually 2 to 10 $\mu$m, preferably 3 to 7 $\mu$m.

As the binder resin used in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof.

Each of these resin binders may contain a functional group such as —OH, —COOH, —$SO_3M$, —$OPO_2M_2$ and —$NH_2$, wherein M represents H, Na or K. In the consideration of good dispersibility of the surface-modified magnetic particles or the ordinary magnetic particles and the surface-modified filler or the ordinary filler in vehicle upon production of a magnetic coating composition, the use of such a binder resins having as a functional group —COOH or —$SO_3M$ is preferred.

The thickness of the magnetic recording layer obtained by applying the magnetic coating composition on the surface of the non-magnetic base film and dried, is usually in the range of 0.01 to 5.0 $\mu$m. If the thickness is less than 0.01 $\mu$m, uniform coating may be difficult, so that unfavorable phenomenon such as unevenness on the coating surface is observed. On the other hand, when the thickness exceeds 5.0 $\mu$m, it may be difficult to obtain desired electromagnetic performance due to an influence of diamagnetism.

The amount of the binder resin contained in the magnetic recording layer is usually 5 to 100 parts by weight, preferably 6 to 50 parts by weight based on 100 parts by weight of the surface-modified magnetic particles or the ordinary magnetic particles contained in the magnetic recording layer.

When the amount of the binder resin is more than 100 parts by weight, the amount of the surface-modified magnetic particles or the ordinary magnetic particles filled in the magnetic recording layer becomes comparatively too small, resulting in deteriorated magnetic properties thereof. When the amount of the binder resin is less than 5 parts by weight, the surface-modified magnetic particles or the ordinary magnetic particles are not sufficiently dispersed in the magnetic coating composition because of a too small amount of the binder resin as compared to the amount of the particles, so that it may be difficult to form a coating film having a sufficiently smooth surface. Also, since the surface-modified magnetic particles or the ordinary magnetic particles cannot be sufficiently bound together by the binder resin, the obtained coating film tends to become brittle.

The amount of the surface-modified filler or the ordinary filler contained in the magnetic recording layer is usually 1 to 30 parts by weight, preferably 3 to 25 parts by weight based on 100 parts by weight of the surface-modified magnetic particles or the ordinary magnetic particles contained in the magnetic recording layer.

When the amount of the surface-modified filler or the ordinary filler is less than 1 part by weight, the obtained magnetic recording medium tends to be deteriorated in durability because of a too small amount of the surface-modified filler or the ordinary filler contained in the magnetic recording layer. When the amount of the surface-modified filler or the filler is more than 30 parts by weight, although the obtained magnetic recording medium exhibits a sufficient durability, the amount of non-magnetic components contained in the magnetic recording layer is increased, which becomes disadvantageous for producing a high-density recording magnetic recording medium.

Meanwhile, the magnetic recording layer may contain, if required, known additives for an ordinary magnetic recording medium such as lubricants, abrasives and antistatic agents in an amount of about 0.1 to about 50 parts by weight based on 100 parts by weight of the binder resin.

The magnetic recording medium using the surface-modified magnetic particles and the ordinary filler according to the present invention has a coercive force value of preferably 39.8 to 318.3 kA/m (500 to 4,000 Oe), more preferably 43.8 to 318.3 kA/m (550 to 4,000 Oe); a squareness (residual magnetic flux density Br/saturation magnetic flux density Bm; hereinafter referred to merely as "squareness") of preferably 0.85 to 0.95, more preferably 0.86 to 0.95; a gloss of coating film of preferably 165 to 300%, more preferably 170 to 300%; a surface roughness Ra of coating film of preferably not more than 10.5 nm, more preferably 2.0 to 10.0 nm; a Young's modulus (relative value to a commercially available video tape: and AV T-120 produced by Victor Company of Japan, Limited) of preferably 126 to 160, more preferably 127 to 160; a running durability of preferably not less than 22 minutes, more preferably not less than 23 minutes; and a scratch resistance of preferably Rank A or B, more preferably Rank A as measured by the below-mentioned evaluation method. In addition, the cyclohexanone diner extraction amount is preferably not more than 50 mg/m$^2$, more preferably not more than 40 mg/m$^2$, still more preferably not more than 30 mg/m$^2$ as measured by the below-mentioned evaluation method.

The magnetic recording medium using the surface-modified magnetic particles and the surface-modified filler according to the present invention has a coercive force value of preferably 39.8 to 318.3 kA/m (500 to 4,000 Oe), more preferably 43.8 to 318.3 kA/m (550 to 4,000 Oe); a squareness (residual magnetic flux density Br/saturation magnetic flux density Bm; hereinafter referred to merely as "squareness") of preferably 0.85 to 0.95, more preferably 0.86 to 0.95; a gloss of coating film of preferably 165 to 300%, more preferably 170 to 300%; a surface roughness Ra of coating film of preferably not more than 10.5 nm, more preferably 2.0 to 10.0 nm; a Young's modulus (relative value to a commercially available video tape: and AV T-120 produced by Victor Company of Japan, Limited) of preferably 127 to 160, more preferably 128 to 160; a running durability of preferably not less than 23 minutes, more preferably not less than 24 minutes; and a scratch resistance of preferably Rank A or B, more preferably Rank A as measured by the below-mentioned evaluation method. In addition, the cyclohexanone dimer extraction amount is preferably not more than 49 mg/m$^2$, more preferably not more than 39 mg/m$^2$, still more preferably not more than 29 mg/m$^2$ as measured by the below-mentioned evaluation method.

Also, in the case where in the consideration of high-density recording, the surface-modified magnetic particles produced by using magnetic acicular metal particles containing iron as a main component or magnetic acicular iron alloy particles as the raw particles, are used together with the ordinary filler, the obtained magnetic recording medium of the present invention has a coercive force value of preferably 63.7 to 278.5 kA/m (800 to 3,500 Oe), more preferably 71.6 to 278.5 kA/m (900 to 3,500 Oe); a squareness (residual magnetic flux density Br/saturation magnetic flux density Bm; hereinafter referred to merely as "squareness") of preferably 0.85 to 0.95, more preferably 0.86 to 0.95; a gloss of coating film of preferably 195 to 300%, more preferably 200 to 300%; a surface roughness Ra of coating film of preferably not more than 9.0 nm, more preferably 2.0 to 8.5 nm; a Young's modulus (relative value to a commercially available video tape: and AV T-120 produced by Victor Company of Japan, Limited) of preferably 131 to 160, more preferably 132 to 160; a running durability of preferably not less than 25 minutes, more preferably not less than 26 minutes; and a scratch resistance of preferably Rank A or B, more preferably Rank A as measured by the below-mentioned evaluation method. In addition, the cyclohexanone dimer extraction amount is preferably not more than 50 mg/m$^2$, more preferably not more than 40 mg/m$^2$, still more preferably not more than 30 mg/m$^2$ as measured by the below-mentioned evaluation method.

Further, in the case where in the consideration of high-density recording or the like, the surface-modified magnetic particles produced by using magnetic acicular metal particles containing iron as a main component or magnetic acicular iron alloy particles as the raw particles are used together with the surface-modified filler, the obtained magnetic recording medium of the present invention has a coercive force value of 63.7 to 278.5 kA/m (800 to 3,500 Oe), more preferably 71.6 to 278.5 kA/m (900 to 3,500 Oe); a squareness (residual magnetic flux density Br/saturation magnetic flux density Bm; hereinafter referred to merely as "squareness") of preferably 0.85 to 0.95, more preferably 0.86 to 0.95; a gloss of coating film of preferably 195 to 300%, more preferably 200 to 300%; a surface roughness Ra of coating film of preferably not more than 9.0 nm, more preferably 2.0 to 8.5 nm; a Young's modulus (relative value to a commercially available video tape: and AV T-120 produced by Victor Company of Japan, Limited) of preferably 132 to 160, more preferably 133 to 160; a running durability of preferably not less than 26 minutes, more preferably not less than 27 minutes;; and a scratch resistance of preferably Rank A or B, more preferably Rank A as measured by the below-mentioned evaluation method. In addition, the cyclohexanone dimer extraction amount is preferably not more than 49 mg/m$^2$, more preferably not more than 39 mg/m$^2$, still more preferably not more than 29 mg/m$^2$ as measured by the below-mentioned evaluation method.

The magnetic recording medium of the present invention may further comprise a non-magnetic undercoat layer disposed between the surface of the non-magnetic base film and the magnetic recording layer, which comprises the surface-modified non-magnetic particles or the ordinary non-magnetic particles and a binder resin.

The non-magnetic undercoat layer of the present invention comprises the surface-modified non-magnetic particles or the ordinary non-magnetic particles and a binder resin.

As the binder resin of the non-magnetic undercoat layer, there may be used the same binder resins as those used for forming the magnetic recording layer.

The amount of the surface-modified non-magnetic particles or the ordinary non-magnetic particles contained in the non-magnetic undercoat layer is preferably 5 to 2,000 parts by weight, more preferably 100 to 1,000 parts by weight based on 100 parts by weight of the binder resin contained in the non-magnetic undercoat layer.

When the amount of the surface-modified non-magnetic particles or the ordinary non-magnetic particles is less than 5 parts by weight, it may be difficult to continuously disperse the surface-modified non-magnetic particles or the ordinary non-magnetic particles in the non-magnetic undercoat layer because of a too small amount of the surface-modified non-magnetic particles or the ordinary non-magnetic particles in a non-magnetic coating composition, resulting in deteriorated surface smoothness of the obtained coating film. When the amount of the surface-modified non-magnetic particles or the ordinary non-magnetic particles is more than 2,000 parts by weight, it may be difficult to sufficiently disperse the surface-modified non-magnetic particles or the ordinary non-magnetic particles in the non-magnetic coating composition because of a too large amount of the surface-modified non-magnetic particles or the ordinary non-magnetic particles as compared to the amount of the binder resin. As a result, it may be difficult to obtain a coating film having a sufficiently smooth surface. In addition, since such a large amount of the surface-modified non-magnetic particles or the ordinary non-magnetic particles cannot be sufficiently bound together by the binder resin, the obtained coating film tends to become brittle.

Meanwhile, the non-magnetic undercoat layer may contain, if required, known additives for an ordinary magnetic recording medium such as lubricants, abrasives and antistatic agents in an amount of about 0.1 to about 50 parts by weight based on 100 parts by weight of the binder resin.

The non-magnetic undercoat layer using the surface-modified non-magnetic particles used in the present invention has a gloss of coating film of preferably 176 to 300%, more preferably 180 to 300%, still more preferably 184 to 300%; a surface roughness Ra of coating film of preferably 0.5 to 11.0 nm, more preferably 0.5 to 10.5 nm; and a Young's modulus (relative value to a commercially available video tape: and AV T-120 produced by Victor Company of Japan, Limited) (as strength of coating film) of preferably 128 to 160, more preferably 130 to 160. In addition, the cyclohexanone dimer extraction amount of the non-magnetic undercoat layer of the present invention is preferably not more than 40 mg/m$^2$, more preferably not more than 30 mg/m$^2$, still more preferably not more than 20 mg/m$^2$ as measured by the below-mentioned evaluation method.

The magnetic recording layer formed on the non-magnetic undercoat layer has a thickness of usually 0.01 to 5 μm, preferably 0.05 to 1 μm. When the thickness of the magnetic recording layer is less than 0.01 μm, it may be difficult to form a uniform coating film, resulting in problems such as coating unevenness or the like. When the thickness of the magnetic recording layer is more than 5 μm, the obtained magnetic recording medium may fail to show an aimed electromagnetic performance because of adverse influence of diamagnetic field.

The magnetic recording medium of the present invention which has the non-magnetic undercoat layer disposed between the non-magnetic base film and the magnetic recording layer, and is produced by using the surface-modified non-magnetic particles, the ordinary magnetic particles and the ordinary filler, respectively, has a coercive force value of preferably 39.8 to 318.3 kA/m (500 to 4,000 Oe), more preferably 43.8 to 318.3 kA/m (550 to 4,000 Oe); a squareness of preferably 0.85 to 0.95, more preferably 0.86 to 0.95; a gloss of coating film of preferably 170 to 300%, more preferably 175 to 300%; a surface roughness Ra of coating film of preferably not more than 10.0 nm, more preferably 2.0 to 9.5 nm; a Young's modulus (relative value to a commercially available video tape: and AV T-120 produced by Victor Company of Japan, Limited) of preferably 128 to 160, more preferably 129 to 160; a running durability of preferably not less than 23 minutes, more preferably not less than 24 minutes; and a scratch resistance of preferably Rank A or B, more preferably Rank A as measured by the below-mentioned evaluation method. In addition, the cyclohexanone dimer extraction amount is preferably not more than 45 mg/m$^2$, more preferably not more than 35 mg/m$^2$, still more preferably not more than 25 mg/m$^2$ as measured by the below-mentioned evaluation method.

The magnetic recording medium of the present invention which has the non-magnetic undercoat layer disposed between the non-magnetic base film and the magnetic recording layer, and is produced by using the surface-modified non-magnetic particles, magnetic acicular metal particles containing iron as a main component or magnetic acicular iron alloy particles, and the ordinary filler, respectively, in the consideration of high-density recording, has a coercive force value of preferably 63.7 to 278.5 kA/m (800 to 3,500 Oe), more preferably 71.6 to 278.5 kA/m (900 to 3,500 Oe); a squareness (residual magnetic flux density Br/saturation magnetic flux density Bm; hereinafter referred to merely as "squareness") of preferably 0.85 to 0.95, more preferably 0.86 to 0.95; a gloss of coating film of preferably 195 to 300%, more preferably 200 to 300%; a surface roughness Ra of coating film of preferably not more than 9.0 nm, more preferably 2.0 to 8.5 nm; a Young's modulus (relative value to a commercially available video tape: and AV T-120 produced by Victor Company of Japan, Limited) of preferably 132 to 160, more preferably 133 to 160; a running durability of preferably not less than 26 minutes, more preferably not less than 27 minutes; and a scratch resistance of preferably Rank A or B, more preferably Rank A as measured by the below-mentioned evaluation method. In addition, the cyclohexanone dimer extraction amount is preferably not more than 45 mg/m$^2$, more preferably not more than 35 mg/m$^2$, still more preferably not more than 25 mg/m$^2$ as measured by the below-mentioned evaluation method.

The magnetic recording medium of the present invention which has the non-magnetic undercoat layer disposed between the non-magnetic base film and the magnetic recording layer, and is produced by using the surface-modified non-magnetic particles, the surface-modified magnetic particles and the ordinary filler, respectively, has a coercive force value of preferably 39.8 to 318.3 kA/m (500 to 4,000 Oe), more preferably 43.8 to 318.3 kA/m (550 to 4,000 Oe); a squareness of preferably 0.85 to 0.95, more preferably 0.86 to 0.95; a gloss of coating film of preferably 175 to 300%, more preferably 180 to 300%; a surface roughness Ra of coating film of preferably not more than 9.5 nm, more preferably 2.0 to 9.0 nm; a Young's modulus (relative value to a commercially available video tape: and AV T-120 produced by Victor Company of Japan, Limited) of preferably 129 to 160, more preferably 130 to 160; a running durability of preferably not less than 24 minutes, more preferably not less than 25 minutes; and a scratch resistance of preferably Rank A or B, more preferably Rank A as measured by the below-mentioned evaluation method. In addition, the cyclohexanone dimer extraction amount is preferably not more than 44 mg/m$^2$, more preferably not more than 34 mg/m$^2$, still more preferably not more than 24 mg/m$^2$ as measured by the below-mentioned evaluation method.

The magnetic recording medium of the present invention which has the non-magnetic undercoat layer disposed between the non-magnetic base film and the magnetic recording layer, and is produced by using the surface-modified non-magnetic particles, the surface-modified magnetic particles and the surface-modified filler, respectively, has a coercive force value of preferably 39.8 to 318.3 kA/m (500 to 4,000 Oe), more preferably 43.8 to 318.3 kA/m (550 to 4,000 Oe); a squareness of preferably 0.85 to 0.95, more preferably 0.86 to 0.95; a gloss of coating film of preferably 175 to 300%, more preferably 180 to 300%; a surface roughness Ra of coating film of preferably not more than 9.5 nm, more preferably 2.0 to 9.0 nm; a Young's modulus (relative value to a commercially available video tape: and AV T-120 produced by Victor Company of Japan, Limited) of preferably 131 to 160, more preferably 132 to 160; a running durability of preferably not less than 25 minutes, more preferably not less than 26 minutes; and a scratch resistance of preferably Rank A or B, more preferably Rank A as measured by the below-mentioned evaluation method. In addition, the cyclohexanone dimer extraction amount is preferably not more than 43 mg/m$^2$, more preferably not more than 33 mg/m$^2$, still more preferably not more than 23 mg/m$^2$ as measured by the below-mentioned evaluation method.

The magnetic recording medium of the present invention which has the non-magnetic undercoat layer disposed between the non-magnetic base film and the magnetic recording layer, and is produced by using the surface-modified non-magnetic particles, the surface-modified magnetic particles obtained using magnetic acicular metal particles containing iron as a main component or magnetic acicular iron alloy particles as the raw particles, and the surface-modified filler, respectively, in the consideration of high-density recording or the like, has a coercive force value of preferably 63.7 to 278.5 kA/m (800 to 3,500 Oe), more preferably 71.6 to 278.5 kA/m (900 to 3,500 Oe); a squareness (residual magnetic flux density Br/saturation magnetic flux density Bm; hereinafter referred to merely as "squareness") of preferably 0.85 to 0.95, more preferably 0.86 to 0.95; a gloss of coating film of preferably 200 to 300%, more preferably 205 to 300%; a surface roughness Ra of coating film of preferably not more than 8.5 nm, more preferably 2.0 to 8.0 nm; a Young's modulus (relative value to a commercially available video tape: and AV T-120 produced by Victor Company of Japan, Limited) of preferably 133 to 160, more preferably 134 to 160; a running durability of preferably not less than 27 minutes, more preferably not less than 28 minutes; and a scratch resistance of preferably Rank A or B, more preferably Rank A as measured by the below-mentioned evaluation method. In addition, the cyclohexanone dimer extraction amount is preferably not more than 43 mg/m$^2$, more preferably not more than 33 mg/m$^2$, still more preferably not more than 23 mg/m$^2$ as measured by the below-mentioned evaluation method.

Next, the process for producing the surface-modified particles used in the present invention is described.

In the present invention, the surface-modified particles comprising the raw particles coated with the organosilane compound produced from the silane monomer can be produced by mechanically mixing and stirring the raw particles with the organosilane compound produced from the silane monomer, or by mechanically mixing and stirring the raw particles and the organosilane compound produced from the silane monomer while spraying the organosilane compound produced from the silane monomer onto the raw particles. In these methods, substantially whole amount of the organosilane compound produced from the silane monomer can be coated onto the surface of the raw particles.

In order to uniformly coat the surface of the raw particles with the organosilane compound produced from the silane monomer, it is preferred that the raw particles are previously deagglomerated by using a pulverizer.

As the apparatus for mixing and stirring the raw particles and the silane monomer, there may be suitably used apparatuses capable of applying a shear force to the particles, more preferably apparatuses capable of conducting the application of shear force, spatula-stroking force and compression force at the same time. As such apparatuses, there may be exemplified wheel-type kneaders, ball-type kneaders, blade-type kneaders, roll-type kneaders or the like. Among these apparatuses, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller or the like. Among these kneaders, an edge runner, a multi-mull, a Stotz mill, a wet pan mill and a ring muller are preferred, and an edge runner is more preferred. Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include am extruder or the like.

In order to coat the surface of the raw particles with the organosilane compound produced from the silane monomer as uniformly as possible, the conditions of the above mixing and stirring treatment may be appropriately controlled such that the linear load is preferably 19.6 1,960 N/cm (2 to 200 Kg/cm), more preferably 98 to 1,470 N/cm (10 to 150 Kg/cm), still more preferably 147 to 980 N/cm (15 to 100 Kg); the treating time is preferably 5 to 180 minutes, more preferably 10 to 120 minutes; and the stirring speed is preferably 2 to 2,000 rpm, more preferably 5 to 1,000 rpm, still more preferably 10 to 800 rpm.

Meanwhile, when readily oxidizable magnetic particles such as magnetite particles, magnetic acicular metal particles containing iron as a main component and magnetic acicular iron alloy particles are used, it is preferred that an inert gas such as $N_2$ is filled in the mixer upon the treatment.

The amount of the silane monomer added is preferably 0.43 to 145.5 parts by weight based on 100 parts by weight of the raw particles to be treated. When the amount of the silane monomer added is less than 0.43 part by weight, it may be difficult to inhibit the production of cyclohexanone diner in the obtained particles. When the amount of the silane monomer added is more than 145.5 parts by weight, the effect of inhibiting the production of cyclohexanone dimer is already saturated and, therefore, the addition of such a large amount of the silane monomer is unnecessary and meaningless.

Meanwhile, the thus surface-treated particles may be preferably subsequently dried or heat-treated. In this case, the drying or heat-treating temperature is preferably 40 to 150° C.m more preferably 60 to 120° C., and the drying or heat-treating time is preferably 10 minutes to 12 hours, more preferably 30 minutes to 3 hours. When the drying or heat-treating temperature is more than 150° C., the silane monomer tends to be vaporized or deteriorated in quality, so that it may be difficult to obtain aimed surface-modified particles.

The surface-modified particles obtained by dry-mixing method, i.e., by mechanically mixing and stirring the raw particles and the silane monomer, or by mechanically mixing and stirring the raw particles and the silane monomer while spraying the silane monomer onto the raw particles, have a resin adsorption of usually not less than 70% and a fatty acid adsorption of usually not more than 16 mg/g. More specifically, the surface-modified magnetic particles exhibit a resin adsorption of usually not less than 70% and a fatty acid adsorption of usually not more than 16 mg/g; the surface-modified filler exhibits a resin adsorption of usually not less than 70% and a fatty acid adsorption of usually not more than 7 mg/g; and the surface-modified non-magnetic particles exhibit a resin adsorption of usually not less than 70% and a fatty acid adsorption of usually not more than 15 mg/g.

Prior to being coating with the organosilane compound produced from the silane monomer, the raw particles may be previously coated with at least one coating material selected from the group consisting of hydroxides of aluminum, oxides of aluminum, hydroxides of silicon and oxides of silicon.

The above coating material may be applied onto the raw particles as follows. That is, an aluminum compound, a silicon compound or both the compounds are added to a water suspension obtained by dispersing the raw particles in water. The resultant suspension is mixed and stirred and, if required, the pH of the suspension is then adjusted to an appropriate value, thereby coating the surface of the raw particles with at least one coating material selected from the group consisting of hydroxides of aluminum, oxides of aluminum, hydroxides of silicon and oxides of silicon. Then, the thus obtained coated particles are filtered out, washed with water, dried and then pulverized. Further, the obtained particles may be subjected to deaeration, compaction or other suitable treatments.

As the aluminum compounds, there may be exemplified aluminum salts such as aluminum acetate, aluminum sulfate, aluminum chloride and aluminum nitrate, alkali aluminates such as sodium aluminate, or the like.

As the silicon compounds, there may be exemplified water glass #3, sodium orthosilicate, sodium metasilicate or the like.

Next, the processes for producing respective magnetic recording medium according to the present invention are described.

The magnetic recording medium of the present invention can be produced by applying a magnetic coating composition containing either surface-modified magnetic particles or ordinary magnetic particles, the surface-modified filler or ordinary filler, a binder resin and a solvent onto a non-magnetic base film to form a coating layer thereon; and subjecting the coating layer to magnetic orientation, calender treatment and then curing, by ordinary methods.

Also, the magnetic recording medium of the present invention can be produced by applying a non-magnetic coating composition containing either surface-modified non-magnetic particles or ordinary non-magnetic particles, a binder resin and a solvent onto a non-magnetic base film and drying the resultant coating layer to form a non-magnetic undercoat layer; applying a magnetic coating composition containing either surface-modified magnetic particles or ordinary magnetic particles, either surface-modified filler or ordinary filler, a binder resin and a solvent onto the non-magnetic undercoat layer, wherein at least one selected from the group consisting of the surface-modified non-magnetic particles, the surface-modified magnetic particles and surface-modified filler is used; and subjecting the resultant coating layer to magnetic orientation, calender treatment and then curing to form a magnetic recording layer, by ordinary methods.

The kneading and dispersing of the magnetic coating composition and the non-magnetic coating composition may be performed using, for example, kneaders such as twin-screw kneader, twin-screw extruder, press kneader, twin-roll mill, triple-roll mill, or dispersing apparatuses such as ball mill, sand grinder, attritor, disper, homogenizer and ultrasonic dispersing device.

The coating of the magnetic coating composition and the non-magnetic coating composition may be conducted using a gravure coater, a reverse roll coater, a slit coater, a die coater or the like. The obtained coating film may be magnetically orientated using opposed magnets, solenoid magnet or the like.

As the solvents, there may be used methyl ethyl ketone, toluene, cyclohexanone, methyl isobutyl ketone, tetrahydrofuran, a mixture of these solvents or the like.

The total amount of the solvent used for the magnetic coating composition is 65 to 1,000 parts by weight based on 100 parts by weight of the particles. When the amount of the solvent used is less than 65 parts by weight, the viscosity of the coating composition prepared therefrom becomes too high, thereby making it difficult to apply the coating composition. On the other hand, when the amount of the solvent used is more than 1,000 parts by weight, the amount of the solvent volatilized during the formation of the coating film becomes too large, thereby rendering the coating process industrially disadvantageous.

The point of the present invention is that the surface-modified particles obtained by coating the surface of the raw particles with the organosilane compound produced from the silane monomer by dry-mixing method, are capable of not only inhibiting the production of cyclohexanone dimer in a coating composition upon production of magnetic recording medium, but also exhibiting a high resin adsorption and a low fatty acid adsorption.

The reason why the production of cyclohexanone dimer in a coating composition can be inhibited by using the surface-modified particles is not clear. However, it is considered that by coating the organosilane compound produced from the silane monomer on the surface of the raw particle, the surface activity of the particles can be reduced.

Hitherto, when the particles are surface-treated for improving the dispersibility in a coating composition upon the production of a magnetic recording medium, the increased resin adsorption thereof is accompanied with increase in fatty acid adsorption, while the reduced fatty acid adsorption thereof leads to reduction in resin adsorption. Thus, the conventional surface treatment has failed to satisfy both the increased resin adsorption and the reduced fatty acid adsorption at the same time. More specifically, in the case of acidic surface treatment (for example, surface-treatment with a silicon-containing coating material), although the fatty acid adsorption of the obtained particles can be reduced due to the acidity of fatty acid, the resin adsorption thereof is also reduced since many of resins used in the coating composition have acidic functional groups. Therefore, the acidic surface treatment has failed to satisfy both the increased resin adsorption and the reduced fatty acid adsorption at the same time. In addition, in the case of basic surface treatment (for example, surface-treatment with an aluminum-containing coating material), although the resin adsorption of the obtained particles can be increased, the fatty acid adsorption is also increased, thereby failing to satisfy both the increased resin adsorption and the reduced fatty acid adsorption at the same time. On the other hand, in the present invention, although the reason why the fatty acid adsorption can be reduced while keeping the high resin adsorption, is not clearly known, it is considered that by coating the surface of the raw particles with the organosilane compound produced from the silane monomer according to the process of the present invention, it is possible to effectively and uniformly form an organosilane compound coat on the surface of the particles.

The magnetic recording medium using the surface-modified particles according to the present invention has a high coating film strength and an excellent running durability. The reason why the magnetic recording medium of the present invention can exhibit a high coating film strength, is considered to be that the production of cyclohexanone diner in the coating composition can be prevented by using the surface-modified particles therein as described above. Also, the reason why the magnetic recording medium of the present invention can exhibit an excellent running durability, is considered to be that the surface-modified particles can be enhanced in resin adsorption and reduced in fatty acid adsorption as described above.

Thus, since the surface-modified particles used in the present invention can effectively prevent the production of cyclohexanone dimer in a magnetic or non-magnetic coating composition, the obtained magnetic recording medium can exhibit excellent coating film strength and running durability. Therefore, the surface-modified particles used in the present invention are suitably used as materials for a high-density magnetic recording medium.

Also, the magnetic recording medium according to the present invention can exhibit excellent coating film strength and running durability by using the surface-modified particles therein and, therefore, suitable as a high-density magnetic recording medium.

EXAMPLES

The present invention is described in more detail by Examples and Comparative Examples, but the Examples are only illustrative and, therefore, not intended to limit the scope of the present invention.

Various properties were evaluated by the following methods.

(1) The average particle size (average major axis diameter, average minor axis diameter, average plate diameter, average thickness and average particle diameter) of the particles to be treated and the surface-modified particles were respectively expressed by average values (measured in a predetermined direction) of about 350 particles which were sampled from a micrograph obtained by magnifying an original electron micrograph (×30,000) by four times in each of the longitudinal and transverse directions.

(2) The aspect ratio of the particles to be treated and the surface-modified particles was expressed by a ratio of average major axis diameter to average minor axis diameter thereof. The plate ratio of the particles to be treated and the surface-modified particles was expressed by a ratio of average particle diameter to average thickness thereof.

(3) The geometrical standard deviation of particle sizes of the particles to be treated and the surface-modified particles was expressed by values obtained by the following method. That is, the particle sizes were measured from the above-magnified photograph. The actual particle sizes and the number of the particles were obtained from the calculation on the basis of the measured values. On a logarithmic normal probability paper, the particle sizes were plotted at regular intervals on the abscissa-axis and the accumulative number of particles belonging to each interval of the particle sizes were plotted by percentage on the ordinate-axis by a statistical technique. The particle sizes corresponding to the number of particles of 50% and 84.13%, respectively, were read from the graph, and the geometrical standard deviation was measured from the following formula:

> Geometrical standard deviation={particle size corresponding to 84.13% under integration sieve}/{particle size (geometrical average diameter) corresponding to 50% under integration sieve}

The more the geometrical standard deviation nears 1.0, the more excellent the particle size distribution of the particles.

(4) The specific surface area of the particles to be treated and the surface-modified particles was expressed by values measured by a BET method.

(5) The amounts of Al, Si, Co, Ti and Ni which were present within the particles to be treated and the surface-modified particles, and/or on the surfaces thereof, the amount of Si contained in organosilane compound produced from the silane monomer were measured by a fluorescent X-ray spectroscopy device 3063M (manufactured by RIGAKU DENKI KOGYO CO., LTD.) according to JIS K0119 "General rule of fluorescent X-ray analysis".

Meanwhile, the amount of Si contained in each of oxides of silicon, hydroxides of silicon and organosilane compound produced from the silane monomer which were coated or were present on the surface of the raw particles or the surface-modified particles, was expressed by the value obtained by subtracting the Si content measured before the respective treatments from the Si content measured after the respective treatments.

(6) The content of $Fe^{2+}$ in the particles to be treated and the surface-modified particles is expressed by the value measured by the following chemical analysis method.

That is, 25 ml of a mixed solution composed of phosphoric acid and sulfuric acid at a mixing ratio of 2:1, was added to 0.5 g of the particles to be treated and the surface-modified particles, thereby dissolving the particles to be treated and the surface-modified particles in the mixed solution. After several droplets of diphenylamine sulfonic acid as an indicator was added to the diluted solution, the solution was subjected to oxidation-reduction titration using an aqueous potassium dichromate solution. The titration was terminated when the diluted solution exhibited a violet color. The amount of $Fe^{2+}$ was measured from the amount of the aqueous potassium dichromate solution used up to the termination of the titration.

(7) The amount of cyclohexanone dimer produced in a coating composition, i.e., the cyclohexanone dimer production activity (mg/g) of the particles, was expressed by the value measured by the following method.

First, sample particles were dried by a dryer at 60° C. for one hour. 2.00 g of the dried sample particles and 20 ml of cyclohexanone were charged into a 50-ml conical flask. After sealing the flask with a Teflon seal, the contents of the flask were subjected to ultrasonic dispersion at 50° C. for 15 minutes, and then allowed to stand for 10 days. The obtained suspension was charged into a 50-ml precipitation tube, and subjected to centrifugal separation at a rotating speed of 10,000 rpm for 15 minutes, thereby separating a supernatant from solids.

Then, the obtained supernatant was analyzed using a gas chromatograph "GC-MS QP5000" (manufactured by Shimadzu Seisakusho Co., Ltd.) to measure a peak area of cyclohexanone dimer. The cyclohexanone dimer production activity of the particles was expressed by the measured value.

(8) The resin adsorptivity of the particles represents the degree at which a resin is adsorbed to the particles. The closer to 100% the value obtained in the following manner, the firmer the resin adsorptivity to the particles surfaces in the vehicle and the more favorable.

The resin adsorptivity Ya was first obtained. 20 g of particles to be measured and 56 g of a mixed solvent (27.0 g of methyl ethyl ketone, 16.2 g of toluene, and 10.8 g of cyclohexanone) with 2 g of a vinyl chloride-vinyl acetate copolymer having a sodium sulfonate group dissolved therein were charged into a 100-ml polyethylene bottle together with 120 g of 3 mmφ steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the centrifugalization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorptivity Ya (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity Ye (mg/g) of resin content dissolved into the solvent phase in the three cycles was obtained, and the value calculated in accordance with the following formula is expressed as the resin adsorptivity T(%):

Resin adsorption(%)=[(Ya−Ye)/Ya]×100.

(9) The fatty acid adsorption of the particles was measured by the following method. The smaller the fatty acid adsorption, the more readily the fatty acid can be oozed out on the surface of the obtained magnetic tape and, therefore, the more excellent the running durability of the magnetic tape.

First, 9 g of the test particles and 45 ml of a tetrahydrofuran solution containing myristic acid in an amount sufficient to coat the surface of the respective particles merely with one layer of myristic acid, were charged together with 100 g of 1.5 mm$\phi$ glass beads into 140-ml glass bottle. The resultant mixture was mixed and dispersed for 60 minutes by a paint shaker.

Then, 50 ml of the resultant dispersion was charged into a 50-ml precipitation tube, and then subjected to centrifugal separation at a rotating speed of 10,000 rpm for 15 minutes, thereby separating a solvent portion from solids. The obtained solvent portion was measured by a gravimetric method to determine the myristic acid concentration thereof. The amount of myristic acid contained in the separated solids was obtained by subtracting the amount of myristic acid calculated based on the myristic acid concentration of the solvent portion, from the amount of myristic acid initially charged. The fatty acid adsorption (mg/g) of the particles was expressed by the measured value.

(10) The magnetic properties of the particles to be treated and the surface-modified particles were measured using a vibration sample magnetometer "VSM-3s$^{-15}$" (manufactured by Toei Kogyo Co., Ltd.) by applying thereto, an external magnetic field of 795.8 kA/m (10 kOe) (39.79 kA/m (5 kOe) in the case where cobalt-coated magnetic iron oxide particles or surface-modified cobalt-coated magnetic iron oxide particles as core particles were used as magnetic particles). The magnetic properties of the magnetic tape were similarly measured by applying thereto, an external magnetic field of 795.8 kA/m (10 kOe) (39.79 kA/m (5 kOe) in the case where cobalt-coated magnetic iron oxide particles or surface-modified cobalt-coated magnetic iron oxide particles were used as magnetic particles).

(11) The viscosity of the coating composition was obtained by measuring the viscosity of the coating composition at 25° C. at a shear rate D of 1.92 sec$^{-1}$ by using "E type viscometer EMD-R" (manufactured by TOKYO KEIKI, CO., LTD.).

(12) The gloss of the surface of the coating film was measured at an incident angle of 45° by a glossmeter "UGV-5D" (manufactured by Suga Shikenki Co., Ltd.), and expressed by the percentage (%) based on the gloss of a standard plate which was assumed to be 86.3%.

(13) The surface roughness Ra is expressed by the center-line average roughness of the surface of the coating film by using "Surfcom-575A" (manufactured by TOKYO SEIMITSU CO., LTD.).

(14) The strength of the coating film was expressed the Young's modulus obtained by "Autograph" (produced by SHIMAZU SEISAKUSHO Co., Ltd.). The Young's modulus was expressed by the ratio of the Young's modulus of the coating film to that of a commercially available video tape "AV T-120" (produce by VICTOR COMPANY OF JAPAN, LIMITED). The higher the relative value, the more the strength of the coating film is favorable.

(15) The durability of the magnetic medium was evaluated by the following running durability and the scratch resistance.

The running durability was evaluated by the actual operating time under the conditions that the load was 1.96 N (200 gw) and the relative speed of the head and the tape was 16 m/s by using "Medium Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch
B: A few scratches
C: Many scratches
D: Great many scratches

(16) The cyclohexanone dimer extraction amount of each of the non-magnetic undercoat layer and magnetic recording medium was evaluated as follows. That is, the test specimen was immersed in methyl ethyl ketone for 24 hours, and the amount of cyclohexanone dimer remaining in the coating film thereof was measured using a gas chromatograph-mass spectrometer "GC-MS QP5000" (manufactured by Shimadzu Seisakusho Co., Ltd.). The measuring conditions are shown below.

Column used: DB-1
Temperature rise rate: 10° C./min. (40° C. to 160° C.)
5° C./min. (160° C. to 300° C.)

(17) The thickness of each of the base film, the non-magnetic undercoat layer and the magnetic recording layer constituting the magnetic recording medium was measured in the following manner by using "Digital Electronic Micrometer R351C" (manufactured by ANRITSU CORP.)

The thickness (A) of a non-magnetic base film was first measured. Similarly, the thickness (B) (B=the sum of the thicknesses of the non-magnetic base film and the non-magnetic undercoat layer) of a non-magnetic substrate obtained by forming a non-magnetic undercoat layer on the non-magnetic base film was measured. Furthermore, the thickness (C) (C=the sum of the thicknesses of the non-magnetic base film, the non-magnetic undercoat layer and the magnetic recording layer) of a magnetic recording medium obtained by forming a magnetic recording layer on the non-magnetic substrate was measured. The thickness of the non-magnetic undercoat layer is expressed by (B)-(A), and the thickness of the magnetic recording layer is expressed by (C)-(B).

Alternatively, the thickness of each of the non-magnetic base film and the magnetic recording layer constituting the magnetic recording medium was measured in the following manner. The thickness (A) of a non-magnetic base film was first measured, and the thickness (C) (C=the sum of the thicknesses of the non-magnetic base film and the magnetic recording layer) of a magnetic recording medium obtained by forming a magnetic recording layer on the non-magnetic base film was measured. The thickness of the magnetic recording layer is expressed by (C)-(A).

Example 1
<Production of Surface-Modified Magnetic Metal Particles>

10 kg of magnetic acicular metal particles containing iron as a main component (particle shape: spindle shape; average major axis diameter: 0.121 μm; average minor axis diameter: 0.0195 μm; aspect ratio: 6.2:1; geometrical standard deviation value: 1.42; BET specific surface area value: 46.3 $m^2/g$; coercive force value: 149.3 kA/m (1,876 Oe); saturation magnetization value: 131.3 $Am^2/kg$ (131.3 emu/g); cyclohexanone diner production activity: 288 mg/g; resin adsorption: 55.7%; fatty acid adsorption: 39.1 mg/g; Co content: 2.10% by weight; Al content: 0.70% by weight; Nd content: 1.31% by weight) were charged into an edge runner "MPUV-2 Model" (tradename, manufactured by MATSUMOTO CHUZO TEKKOSHO CO., LTD.). Then, 1,000 g of methyl triethoxysilane (tradename: "TSL8123", produced by GE TOSHIBA SILICONE CO., LTD.) was added to the magnetic acicular metal particles containing iron as a main component while operating the edge runner. The obtained mixture was mixed and stirred at a linear load of 392 N/cm (40 Kg/cm) and a stirring speed of 22 rpm for 40 minutes, and then heat-treated at 80° C. for 60 minutes using a dryer, thereby obtaining surface-modified magnetic particles.

Meanwhile, the above heat-treatment was conducted in a nitrogen atmosphere in order to prevent deterioration of magnetic properties of the particles by oxidation.

It was confirmed that the obtained surface-modified magnetic metal particles were acicular particles having an average major axis diameter of 0.121 μm; an average minor axis diameter of 0.0195 μm; an aspect ratio of 6.2:1; a geometrical standard deviation value of 1.42; a BET specific surface area value of 42.4 $m^2/g$; a cyclohexanone dimer production activity of 38.0 mg/g; a resin adsorption of 78.4%; a fatty acid adsorption of 6.2 mg/g; a coercive force value of 148.2 kA/m (1,862 Oe); and a saturation magnetization value of 128.1 $Am^2/kg$ (128.1 emu/g). Further, it was confirmed that the amount of methyl triethoxysilane coated was 1.43% by weight (calculated as Si).

Example 2
<Production of Magnetic Recording Medium>

100.0 parts by weight of the surface-modified magnetic metal particles obtained in Example 1, 10.0 parts by weight of vinyl chloride-vinyl acetate copolymer resin (tradename: "MR-110", produced by Nippon Zeon Co., Ltd.), 23.3 parts by weight of cyclohexanone, 10.0 parts by weight of methyl ethyl ketone, 1.0 part by weight of fine carbon black particles (produced by Mitsubishi Kagaku Co., Ltd.; average particle diameter: 26 nm, BET specific surface area value: 130 $m^2/g$) and 7.0 parts by weight of alumina particles ("AKP-30", produced by Sumitomo Kagaku Co., Ltd.; average particle diameter: 0.4 μm) were kneaded together by a kneader for 20 minutes. Then, the obtained kneaded material was diluted with 79.6 parts by weight of toluene, 110.2 parts by weight of methyl ethyl ketone and 17.8 parts by weight of cyclohexanone. The obtained mixture was mixed and dispersed by a sand grinder for 3 hours, thereby obtaining a dispersion.

The resultant dispersion was mixed with 33.3 parts by weight of a methyl ethyl ketone/toluene solution (methyl ethyl ketone: toluene=1:1) containing 10.0 parts by weight (based on solid content) of polyurethane resin, and the mixture was further mixed and dispersed by a sand grinder for 30 minutes. Then, after the obtained dispersion was passed through a 1 μm-mesh filter, the resultant filter cake was mixed with 12.1 parts by weight of a methyl ethyl ketone/toluene/cyclohexanone solution (methyl ethyl ketone: toluene: cyclohexanone=5:3:2) containing 1.0 part by weight of myristic acid and 3.0 parts by weight of butyl acetate, and 15.2 parts by weight of a methyl ethyl ketone/toluene/cyclohexanone solution (methyl ethyl ketone: toluene: cyclohexanone=5:3:2) containing 5.0 parts by weight of trifunctional low-molecular weight polyisocyanate (tradename "E-31", produced by Takeda Yakuhin Kogyo Co., Ltd.) while stirring, thereby obtaining a magnetic coating composition.

The thus-obtained magnetic coating composition was as follows.

| | |
|---|---|
| Surface-modified magnetic metal particles | 100.0 parts by weight |
| Vinyl chloride-vinyl acetate copolymer resin | 10.0 parts by weight |
| Polyurethane resin | 10.0 parts by weight |
| Alumina particles | 7.0 parts by weight |
| Fine carbon black particles | 1.0 part by weight |
| Myristic acid | 1.0 part by weight |
| Butyl stearate | 3.0 parts by weight |
| Trifunctional low-molecular weight polyisocyanate | 5.0 parts by weight |
| Cyclohexanone | 56.6 parts by weight |
| Methyl ethyl ketone | 141.5 parts by weight |
| Toluene | 85.4 parts by weight |

It was confirmed that the obtained magnetic coating composition had a viscosity of 6,023 cP.

The thus-obtained magnetic coating composition was passed though a 1 μm-mesh filter, applied onto a 12 μm-thick polyethylene terephthalate film using a slit coater, and then dried, thereby forming a magnetic layer. The thus formed magnetic layer was subjected to calender treatment by ordinary method to smoothen the surface thereof. Then, the thus obtained film was cut into a width of 1.27 cm (½ inch), and then allowed to stand at 60° C. in a curing oven for 24 hours for sufficiently curing the coating layer, thereby obtaining a magnetic tape. The thus obtained magnetic tape had a 3.5 μm-thick coating layer.

It was confirmed that as to magnetic properties, the obtained magnetic tape had a coercive force value of 152.8 kA/m (1,920 Oe); a squareness (Br/Bm) of 0.89; a gloss of 220%; a surface roughness Ra of 5.9 nm; a Young's modulus of 141; a running durability of not less than 30 minutes; a scratch resistance of Rank A; and a cyclohexanone dimer extraction amount of 23 $mg/m^2$.

Raw Particles 1 to 9:

As the particles to be treated, raw particles 1 to 9 as shown in Table 1 were prepared.

Raw Particles 10:

20 kg of acicular hematite particles obtained by deagglomerating the raw particles 1 were dispersed in 150 liters of water by the same method as defined in Example 1, thereby preparing a slurry containing the acicular hematite particles. The pH value of the obtained re-dispersed slurry containing the acicular hematite particles was adjusted to 10.5. Then, the concentration of the slurry was adjusted to 98 g/liter by adding water thereto. 150 liters of the slurry was heated to 60° C., and charged with 5,444 ml of a 1.0-mol/l $NaAlO_2$ solution (corresponding to 1.0% by weight (calculated as Al) based on the weight of the acicular hematite particles). The resultant mixture was allowed to stand for 30 minutes, and the pH value thereof was adjusted to 7.5 using acetic acid. The mixture was further allowed to stand for 30 minutes, and then subjected to filtration, washing with water, drying and then pulverization, thereby obtaining acicular hematite particles coated with hydroxides of aluminum.

Various properties of the obtained acicular hematite particles coated with hydroxides of aluminum are shown in Table 3.

Raw particles 11 to 14:

The same procedure as defined above for production of the raw particles 10 was conducted except that kind of raw particles, and kind and amount of additives used in surface-treatment step, were changed variously, thereby obtaining surface-treated particles.

Main treatment conditions are shown in Table 2, and various properties of the obtained surface-treated particles are shown in Table 3.

Examples 3 to 16 and Comparative
Examples 1 to 3:

The same procedure as defined in Example 1 was conducted except that kind of raw particles, kind and amount of silane monomer added, and edge runner treatment conditions were changed variously, thereby surface-modified particles.

Main treatment conditions are shown in Table 4, and various properties of the obtained surface-modified particles are shown in Tables 5 and 6.

Comparative Example 4:

The raw particles 1 (acicular hematite particles) were charged into a solution prepared by dissolving methyl triethoxysilane (tradename: "TSL8123", produced by GE Toshiba Silicone Co., Ltd.) in ethanol, and the resultant slurry was intimately mixed and stirred. After mixing, the acicular hematite particles were taken off from the slurry, and then dried, thereby obtaining acicular hematite particles coated with organosilane compounds. It was confirmed that the amount of the organosilane compounds coated on the surface of the acicular hematite particles was 1.02% by weight (calculated as Si) based on the weight of the acicular hematite particles coated with organosilane compounds.

Comparative Example 5

The same procedure as defined in Comparative Example 4 was conducted except that the raw particles 8 (Co-coated acicular maghemite particles) were used, thereby obtaining Co-coated acicular maghemite particles coated with organosilane compounds. It was confirmed that the amount of the organosilane compound coat on the surface of the Co-coated acicular maghemite particles was 0.96% by weight (calculated as Si) based on the weight of the Co-coated acicular maghemite particles coated with the organosilane compounds.

Comparative Example 6

One part by weight of methyl trimethoxysilane (produced by GE Toshiba Silicone Co., Ltd.) as the organometallic compound was added to 100 parts by weight of the raw particles 1 (acicular hematite particles), and the obtained mixture was intimately mixed and stirred using a Henschel mixer. The mixture was placed in a heating oven (electric furnace) heated to 400° C., and heat-treated therein for 6 hours, thereby obtaining heat-treated acicular hematite particles. It was confirmed that the amount of the organosilane compound coat on the surface of the heat-treated acicular hematite particles was 1.06% by weight (calculated as Si) based on the weight of the heat-treated acicular hematite particles coated with the organosilane compounds.

Comparative Example 7

The same procedure as defined in Comparative Example 6 was conducted except that the raw particles 8 (Co-coated acicular maghemite particles) were used, thereby obtaining heat-treated Co-coated acicular maghemite particles. It was confirmed that the amount of the organosilane compound coat on the surface of the heat-treated Co-coated acicular maghemite particles was 1.05% by weight (calculated as Si) based on the weight of the heat-treated Co-coated acicular maghemite particles coated with the organosilane compounds.

Various properties of the obtained particles are shown in Table 6.

Examples 17 to 24 and Comparative
Examples 8 to 11

<Production of Magnetic Recording Medium>

The same procedure as defined in Example 2 was conducted except that kind of magnetic particles, and kind and amount of fillers were changed variously, thereby obtaining a magnetic recording medium.

Main production conditions are shown in Table 7, and various properties of the obtained magnetic recording medium are shown in Table 8.

Example 25

<Production of Non-Magnetic Undercoat Layer>

12 g of the surface-modified hematite particles obtained in Example 3 having properties as shown in Table 5, a binder resin solution (30% by weight of vinyl chloride-vinyl acetate copolymer resin having a sodium sulfonate group and 70% by weight of cyclohexanone) and cyclohexanone were mixed with each other to obtain a mixture. The mixture was further kneaded by a plast-mill for 30 minutes to obtain a kneaded material.

The thus-obtained kneaded material was charged into a 140 ml glass bottle together with 95 g of 1.5 mmφ glass beads, an additional binder resin solution (30% by weight of polyurethane resin having a sodium sulfonate group and 70% by weight of a mixed solvent (methyl ethyl ketone: toluene 1:1)), cyclohexanone, methyl ethyl ketone and toluene, and the mixture was mixed and dispersed by a paint shaker for 6 hours, thereby obtaining a coating composition. Then, a lubricant was added to the coating composition, and the resultant mixture was mixed and dispersed by a paint shaker for 15 minutes.

The thus-obtained non-magnetic coating composition was as follows.

| | |
|---|---|
| Non-magnetic particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Lubricant (myristic acid:butyl stearate = 1:1) | 2 parts by weight |
| Cyclohexanone | 56.9 parts by weight |
| Methyl ethyl ketone | 142.3 parts by weight |
| Toluene | 85.4 parts by weight |

Then, the obtained non-magnetic coating composition was applied onto a 12 µm-thick polyethylene terephthalate film using a slit coater, and then dried, thereby forming a non-magnetic undercoat layer.

Main production conditions and various properties of the obtained non-magnetic undercoat layer are shown in Table 9.

Examples 26 to 30 and Comparative Examples 12 to 17

The same procedure as defined in Example 25 was conducted except that kinds of non-magnetic particles were changed variously, thereby obtaining non-magnetic undercoat layers.

Main production conditions and various properties of the obtained non-magnetic undercoat layers are shown in Table 9.

Example 31

<Production of Magnetic Recording Medium Having Non-Magnetic Undercoat Layer>

A magnetic coating composition was produced by the same method as defined in Example 2 except for using the surface-modified magnetic particles obtained in Example 8.

The thus obtained magnetic coating composition was applied onto the undercoat layer 1 using a slit coater, magnetically oriented in a magnetic field, dried, and then subjected to calender treatment. The obtained coated film was slit into a width of 1.27 cm (0.5 inch), and then subjected to curing reaction at 60° C. for 24 hours, thereby obtaining a magnetic tape.

Main production conditions are shown in Table 10, and various properties of the obtained magnetic recording medium are shown in Table 11.

Examples 32 to 39 and Comparative Examples 18 to 23

The same procedure as defined in Example 31 was conducted except that kinds of non-magnetic undercoat layer, kinds of magnetic particles, and kinds and amounts of fillers blended were changed variously, thereby obtaining a magnetic recording medium.

Main production conditions are shown in Table 10, and various properties of the obtained magnetic recording medium are shown in Table 11.

TABLE 1

| | Properties of raw particles | |
|---|---|---|
| Raw particles | Kind | Shape |
| Raw particles 1 | Hematite particles | Acicular |
| Raw particles 2 | Hematite particles | Spindle-shaped |
| Raw particles 3 | Goethite particles | Acicular |
| Raw particles 4 | Hematite particles | Granular |
| Raw particles 5 | Aluminum oxide | Granular |
| Raw particles 6 | Magnetic metal particles containing iron as a main component (Al content: 2.71 wt. %; Co content: 5.78 wt. %) | Spindle-shaped |
| Raw particles 7 | Co-coated magnetite particles (Co content: 4.72 wt. %; $Fe^{2+}$ content: 15.6 wt. %) | Spindle-shaped |
| Raw particles 8 | Co-coated maghemite particles (Co content: 2.74 wt. %) | Acicular |
| Raw particles 9 | Barium ferrite particles (Ti/Fe = 1.5 mol %; Ni/Fe = 2.8 mol %) | Plate-shaped |

| | Properties of raw particles | | | |
|---|---|---|---|---|
| Raw particles | Average major axis diameter (µm) | Average minor axis diameter (µm) | Aspect ratio (–) | Geometrical standard deviation value (–) |
| Raw particles 1 | 0.143 | 0.0210 | 6.8:1 | 1.38 |
| Raw particles 2 | 0.187 | 0.0240 | 7.8:1 | 1.33 |
| Raw particles 3 | 0.240 | 0.0272 | 8.8:1 | 1.37 |
| Raw particles 4 | 0.113 | — | — | 1.35 |
| Raw particles 5 | 0.201 | — | — | 1.31 |
| Raw particles 6 | 0.126 | 0.0175 | 7.2:1 | 1.39 |
| Raw particles 7 | 0.151 | 0.0219 | 6.9:1 | 1.43 |
| Raw particles 8 | 0.275 | 0.0335 | 8.2:1 | 1.41 |
| Raw particles 9 | 0.032 | 0.0089 | 3.6:1 | 1.40 |

| | Properties of raw particles | | |
|---|---|---|---|
| | | Magnetic properties | |
| Raw particles | BET specific surface area value ($m^2$/g) | Coercive force value (kA/m) | Saturation magnetization value ($Am^2$/kg) |
| Raw particles 1 | 55.3 | — | — |
| Raw particles 2 | 43.3 | — | — |
| Raw particles 3 | 86.3 | — | — |
| Raw particles 4 | 15.3 | — | — |
| Raw particles 5 | 10.4 | — | — |
| Raw particles 6 | 53.5 | 152.6 | 136.1 |
| Raw particles 7 | 52.6 | 72.6 | 81.0 |
| Raw particles 8 | 36.1 | 54.7 | 77.1 |
| Raw particles 9 | 58.8 | 205.9 | 50.1 |

| | Properties of raw particles | | |
|---|---|---|---|
| Raw particles | Cyclohexanone dimer production activity (mg/g) | Resin adsorption (%) | Fatty acid adsorption (mg/g) |
| Raw particles 1 | 231 | 49.2 | 22.6 |
| Raw particles 2 | 268 | 48.6 | 20.8 |
| Raw particles 3 | 345 | 47.0 | 59.5 |
| Raw particles 4 | 121 | 50.1 | 10.2 |
| Raw particles 5 | 86 | 45.0 | 10.6 |
| Raw particles 6 | 265 | 52.6 | 37.5 |
| Raw particles 7 | 384 | 48.6 | 41.3 |
| Raw particles 8 | 166 | 46.5 | 19.9 |
| Raw particles 9 | 268 | 43.2 | 29.6 |

TABLE 2

| Raw particles | Kind of raw particles | Surface-treating step Additives Kind | Calculated as | Amount (wt. %) |
|---|---|---|---|---|
| Raw particles 10 | Raw particles 1 | Sodium aluminate | Al | 1.0 |
| Raw particles 11 | Raw particles 2 | Water glass #3 | SiO$_2$ | 0.5 |
| Raw particles 12 | Raw particles 3 | Sodium aluminate | Al | 1.0 |
| | | Water glass #3 | SiO$_2$ | 2.5 |
| Raw particles 13 | Raw particles 4 | Aluminum sulfate | Al | 0.5 |
| | | Water glass #3 | SiO$_2$ | 1.5 |
| Raw particles 14 | Raw particles 7 | Water glass #3 | SiO$_2$ | 0.50 |

| Raw particles | Surface-treating step Coating material Kind | Calculated as | Amount (wt. %) |
|---|---|---|---|
| Raw particles 10 | A | Al | 0.98 |
| Raw particles 11 | S | SiO$_2$ | 0.48 |
| Raw particles 12 | A | Al | 0.96 |
| | S | SiO$_2$ | 2.41 |
| Raw particles 13 | A | Al | 0.48 |
| | S | SiO$_2$ | 1.45 |
| Raw particles 14 | S | SiO$_2$ | 0.49 |

TABLE 3

| Raw particles | Properties of surface-treated raw particles | | | |
|---|---|---|---|---|
| | Average major axis diameter (μm) | Average minor axis diameter (μm) | Aspect ratio (–) | Geometrical standard deviation value (–) |
| Raw particles 10 | 0.143 | 0.0210 | 6.8:1 | 1.37 |
| Raw particles 11 | 0.187 | 0.0241 | 7.8:1 | 1.33 |
| Raw particles 12 | 0.241 | 0.0272 | 8.9:1 | 1.36 |
| Raw particles 13 | 0.113 | — | — | 1.35 |
| Raw particles 14 | 0.151 | 0.0222 | 6.8:1 | 1.43 |

| Raw particles | Properties of surface-treated raw particles | | |
|---|---|---|---|
| | BET specific surface area value (m$^2$/g) | Magnetic properties | |
| | | Coercive force value (kA/m) | Saturation magnetization value (Am$^2$/kg) |
| Raw particles 10 | 54.9 | — | — |
| Raw particles 11 | 43.6 | — | — |
| Raw particles 12 | 85.9 | — | — |
| Raw particles 13 | 17.1 | — | — |
| Raw particles 14 | 53.6 | 72.1 | 80.1 |

| Raw particles | Properties of surface-treated raw particles | | |
|---|---|---|---|
| | Cyclohexanone dimer production activity (mg/g) | Resin adsorption (%) | Fatty acid adsorption (mg/g) |
| Raw particles 10 | 186 | 56.5 | 25.8 |
| Raw particles 11 | 198 | 54.3 | 17.0 |
| Raw particles 12 | 214 | 52.3 | 53.3 |
| Raw particles 13 | 99 | 54.2 | 8.8 |
| Raw particles 14 | 230 | 52.7 | 36.2 |

TABLE 4

| Examples and Comparative Examples | Kind of raw particles |
|---|---|
| Example 3 | Raw particles 1 |
| Example 4 | Raw particles 2 |
| Example 5 | Raw particles 3 |
| Example 6 | Raw particles 4 |
| Example 7 | Raw particles 5 |
| Example 8 | Raw particles 6 |
| Example 9 | Raw particles 7 |
| Example 10 | Raw particles 8 |
| Example 11 | Raw particles 9 |
| Example 12 | Raw particles 10 |
| Example 13 | Raw particles 11 |
| Example 14 | Raw particles 12 |
| Example 15 | Raw particles 13 |
| Example 16 | Raw particles 14 |
| Comparative Example 1 | Raw particles 1 |
| Comparative Example 2 | Raw particles 5 |
| Comparative Example 3 | Raw particles 7 |

| Examples and Comparative Examples | Production of surface-modified particles Coating step with silane monomer Additives Kind | Amount added (wt. part) |
|---|---|---|
| Example 3 | Methyl triethoxysilane | 15.0 |
| Example 4 | Methyl trimethoxysilane | 8.0 |
| Example 5 | Dimethyl dimethoxysilane | 15.0 |
| Example 6 | Methyl triethoxysilane | 5.0 |
| Example 7 | Phenyl triethoxysilane | 3.0 |
| Example 8 | Methyl trimethoxysilane | 10.0 |
| Example 9 | Methyl triethoxysilane | 12.0 |
| Example 10 | Phenyl triethoxysilane | 10.0 |
| Example 11 | Methyl triethoxysilane | 15.0 |
| Example 12 | Phenyl triethoxysilane | 14.0 |
| Example 13 | Methyl trimethoxysilane | 8.0 |
| Example 14 | Methyl trimethoxysilane | 15.0 |
| Example 15 | Phenyl triethoxysilane | 5.0 |
| Example 16 | Dimethyl diethoxysilane | 10.0 |
| Comparative Example 1 | Methyl triethoxysilane | 0.30 |
| Comparative Example 2 | Methyl triethoxysilane | 0.30 |
| Comparative Example 3 | Methyl triethoxysilane | 0.30 |

| Examples and Comparative Examples | Production of surface-modified particles Coating step with silane monomer | | | Amount coated (calculated as Si) (wt. %) |
|---|---|---|---|---|
| | Edge runner treatment | | | |
| | Linear load | | Time (min) | |
| | (N/cm) | (kg/cm) | | |
| Example 3 | 392 | 40 | 40 | 2.05 |
| Example 4 | 490 | 50 | 20 | 1.52 |
| Example 5 | 392 | 40 | 20 | 3.03 |
| Example 6 | 588 | 60 | 40 | 0.75 |
| Example 7 | 441 | 45 | 30 | 0.41 |
| Example 8 | 735 | 75 | 20 | 1.87 |
| Example 9 | 588 | 60 | 40 | 1.68 |
| Example 10 | 441 | 45 | 30 | 1.28 |
| Example 11 | 588 | 60 | 25 | 2.05 |
| Example 12 | 441 | 45 | 40 | 1.73 |
| Example 13 | 392 | 40 | 30 | 1.52 |

TABLE 4-continued

| Examples | | | | |
|---|---|---|---|---|
| Example 14 | 490 | 50 | 35 | 2.68 |
| Example 15 | 735 | 75 | 20 | 0.67 |
| Example 16 | 490 | 50 | 30 | 2.12 |
| Comparative Example 1 | 588 | 60 | 30 | 0.04 |
| Comparative Example 2 | 588 | 60 | 30 | 0.04 |
| Comparative Example 3 | 588 | 60 | 30 | 0.04 |

TABLE 5

Properties of surface-modified particles

| Examples | Average major axis diameter (μm) | Average minor axis diameter (μm) | Aspect ratio (-) | Geometrical standard deviation value (-) |
|---|---|---|---|---|
| Example 3 | 0.143 | 0.0211 | 6.8:1 | 1.38 |
| Example 4 | 0.187 | 0.0241 | 7.8:1 | 1.33 |
| Example 5 | 0.241 | 0.0273 | 8.8:1 | 1.37 |
| Example 6 | 0.113 | — | — | 1.35 |
| Example 7 | 0.201 | — | — | 1.31 |
| Example 8 | 0.126 | 0.0176 | 7.2:1 | 1.39 |
| Example 9 | 0.151 | 0.0220 | 6.9:1 | 1.43 |
| Example 10 | 0.275 | 0.0336 | 8.2:1 | 1.41 |
| Example 11 | 0.032 | 0.0090 | 3.6:1 | 1.40 |
| Example 12 | 0.143 | 0.0211 | 6.8:1 | 1.38 |
| Example 13 | 0.187 | 0.0241 | 7.8:1 | 1.33 |
| Example 14 | 0.241 | 0.0273 | 8.8:1 | 1.37 |
| Example 15 | 0.113 | — | — | 1.35 |
| Example 16 | 0.151 | 0.0222 | 6.8:1 | 1.43 |

Properties of surface-modified particles

| Examples | BET specific surface area value (m²/g) | Magnetic properties Coercive force value (kA/m) | Saturation magnetization value (Am²/kg) |
|---|---|---|---|
| Example 3 | 50.6 | — | — |
| Example 4 | 39.6 | — | — |
| Example 5 | 80.2 | — | — |
| Example 6 | 13.2 | — | — |
| Example 7 | 9.6 | — | — |
| Example 8 | 46.5 | 151.3 | 131.2 |
| Example 9 | 42.3 | 71.8 | 78.3 |
| Example 10 | 29.8 | 54.3 | 75.0 |
| Example 11 | 50.9 | 201.9 | 46.8 |
| Example 12 | 51.1 | — | — |
| Example 13 | 36.4 | — | — |
| Example 14 | 78.2 | — | — |
| Example 15 | 10.0 | — | — |
| Example 16 | 46.8 | 71.6 | 76.9 |

Properties of surface-modified particles

| Examples | Cyclohexanone dimer production activity (mg/g) | Resin adsorption (%) | Fatty acid adsorption (mg/g) |
|---|---|---|---|
| Example 3 | 36 | 79.1 | 5.1 |
| Example 4 | 32 | 76.2 | 7.3 |
| Example 5 | 48 | 75.5 | 10.8 |
| Example 6 | 19 | 78.3 | 3.2 |
| Example 7 | 18 | 76.0 | 4.3 |
| Example 8 | 39 | 79.8 | 14.3 |
| Example 9 | 39 | 78.4 | 14.6 |
| Example 10 | 33 | 75.4 | 11.6 |
| Example 11 | 40 | 77.1 | 13.2 |
| Example 12 | 32 | 81.5 | 4.3 |
| Example 13 | 30 | 78.6 | 5.6 |
| Example 14 | 40 | 77.7 | 9.6 |
| Example 15 | 15 | 80.2 | 2.9 |
| Example 16 | 35 | 81.9 | 13.9 |

TABLE 6

Properties of surface-modified particles

| Comparative Examples | Average major axis diameter (μm) | Average minor axis diameter (μm) | Aspect ratio (-) | Geometrical standard deviation value (-) |
|---|---|---|---|---|
| Comparative Example 1 | 0.143 | 0.0210 | 6.8:1 | 1.38 |
| Comparative Example 2 | 0.201 | — | — | 1.31 |
| Comparative Example 3 | 0.151 | 0.0219 | 6.9:1 | 1.43 |
| Comparative Example 4 | 0.143 | 0.0210 | 6.8:1 | 1.38 |
| Comparative Example 5 | 0.275 | 0.0335 | 8.2:1 | 1.41 |
| Comparative Example 6 | 0.142 | 0.0208 | 6.8:1 | 1.38 |
| Comparative Example 7 | 0.274 | 0.0335 | 8.2:1 | 1.41 |

Properties of surface-modified particles

| Comparative Examples | BET specific surface area value (m²/g) | Magnetic properties Coercive force value (kA/m) | Saturation magnetization value (Am²/kg) |
|---|---|---|---|
| Comparative Example 1 | 55.6 | — | — |
| Comparative Example 2 | 9.9 | — | — |
| Comparative Example 3 | 51.8 | 72.1 | 79.3 |
| Comparative Example 4 | 49.6 | — | — |
| Comparative Example 5 | 32.2 | 54.4 | 75.8 |
| Comparative Example 6 | 47.3 | — | — |
| Comparative Example 7 | 30.7 | 54.0 | 75.6 |

Properties of surface-modified particles

| Comparative Examples | Cyclohexanone dimer production activity (mg/g) | Resin adsorption (%) | Fatty acid adsorption (mg/g) |
|---|---|---|---|
| Comparative Example 1 | 196 | 56.3 | 20.2 |
| Comparative Example 2 | 72 | 50.3 | 8.4 |
| Comparative Example 3 | 303 | 52.0 | 38.6 |
| Comparative Example 4 | 161 | 60.1 | 18.1 |
| Comparative Example 5 | 128 | 58.9 | 16.3 |

TABLE 6-continued

| | | | |
|---|---|---|---|
| Comparative Example 6 | 211 | 61.6 | 18.9 |
| Comparative Example 7 | 140 | 60.4 | 16.8 |

TABLE 7

| | Production of magnetic recording medium Magnetic particles | |
|---|---|---|
| Examples and Comparative Examples | Kind | Amount blended (wt. part) |
| Example 17 | Example 8 | 100 |
| Example 18 | Example 9 | 100 |
| Example 19 | Example 10 | 100 |
| Example 20 | Example 11 | 100 |
| Example 21 | Example 16 | 100 |
| Example 22 | Example 8 | 100 |
| Example 23 | Example 8 | 100 |
| Example 24 | Example 16 | 100 |
| Comparative Example 8 | Raw particles 6 | 100 |
| Comparative Example 9 | Comparative Example 3 | 100 |
| Comparative Example 10 | Comparative Example 5 | 100 |
| Comparative Example 11 | Comparative Example 7 | 100 |

| | Production of magnetic recording medium Filler | | Properties of coating composition |
|---|---|---|---|
| Examples and Comparative Examples | Kind | Amount blended (wt. part) | Viscosity (cP) |
| Example 17 | Raw particles 5 | 10 | 5,603 |
| Example 18 | Raw particles 5 | 7 | 2,832 |
| Example 19 | Raw particles 5 | 10 | 2,301 |
| Example 20 | Raw particles 5 | 5 | 4,683 |
| Example 21 | Raw particles 5 | 13 | 2,642 |
| Example 22 | Example 6 | 15 | 7,602 |
| Example 23 | Example 7 | 12 | 6,309 |
| Example 24 | Example 15 | 10 | 1,843 |
| Comparative Example 8 | Raw particles 5 | 7 | 10,240 |
| Comparative Example 9 | Comparative Example 2 | 7 | 9,968 |
| Comparative Example 10 | Comparative Example 2 | 7 | 3,421 |
| Comparative Example 11 | Comparative Example 2 | 7 | 3,203 |

TABLE 8

| | Properties of magnetic recording medium | | |
|---|---|---|---|
| Examples and Comparative Examples | Thickness of magnetic layer (μm) | Coercive force value (kA/m) | Br/Bm (-) |
| Example 17 | 3.6 | 156.9 | 0.88 |
| Example 18 | 3.5 | 74.3 | 0.89 |
| Example 19 | 3.5 | 59.2 | 0.89 |
| Example 20 | 3.6 | 210.3 | 0.88 |
| Example 21 | 3.5 | 78.3 | 0.89 |
| Example 22 | 3.6 | 157.3 | 0.89 |
| Example 23 | 3.7 | 157.0 | 0.90 |
| Example 24 | 3.4 | 78.9 | 0.91 |
| Comparative Example 8 | 3.5 | 155.1 | 0.85 |

TABLE 8-continued

| | | | |
|---|---|---|---|
| Comparative Example 9 | 3.6 | 74.3 | 0.84 |
| Comparative Example 10 | 3.6 | 58.2 | 0.85 |
| Comparative Example 11 | 3.5 | 57.6 | 0.85 |

| | Properties of magnetic recording medium | | |
|---|---|---|---|
| Examples and Comparative Examples | Gloss (%) | Surface roughness Ra (nm) | Young's modulus (relative value) |
| Example 17 | 213 | 6.2 | 141 |
| Example 18 | 182 | 7.3 | 145 |
| Example 19 | 186 | 7.3 | 146 |
| Example 20 | 211 | 6.0 | 144 |
| Example 21 | 186 | 6.4 | 144 |
| Example 22 | 216 | 6.0 | 142 |
| Example 23 | 218 | 5.8 | 145 |
| Example 24 | 191 | 6.0 | 148 |
| Comparative Example 8 | 193 | 12.8 | 126 |
| Comparative Example 9 | 172 | 11.0 | 133 |
| Comparative Example 10 | 170 | 10.6 | 133 |
| Comparative Example 11 | 161 | 10.8 | 127 |

| | Properties of magnetic recording medium | | |
|---|---|---|---|
| | Durability | | Cyclohexanone |
| Examples and Comparative Examples | Running durability (min) | Scratch resistance (-) | dimer extraction amount (mg/m²) |
| Example 17 | 27.9 | A | 25 |
| Example 18 | ≥30 | A | 23 |
| Example 19 | ≥30 | A | 21 |
| Example 20 | 29.6 | A | 23 |
| Example 21 | ≥30 | A | 24 |
| Example 22 | ≥30 | A | 22 |
| Example 23 | ≥30 | A | 21 |
| Example 24 | ≥30 | A | 19 |
| Comparative Example 8 | 17.4 | C | 143 |
| Comparative Example 9 | 13.6 | C | 162 |
| Comparative Example 10 | 15.3 | C | 70 |
| Comparative Example 11 | 11.0 | D | 76 |

TABLE 9

| | Production of non-magnetic coating composition | | Properties of coating composition |
|---|---|---|---|
| Examples and Comparative Examples | Kind of non-magnetic particles | Weight ratio of particles to resin (-) | Viscosity (cP) |
| Example 25 | Example 3 | 5.0 | 384 |
| Example 26 | Example 4 | 5.0 | 410 |
| Example 27 | Example 5 | 5.0 | 384 |
| Example 28 | Example 12 | 5.0 | 272 |
| Example 29 | Example 13 | 5.0 | 330 |
| Example 30 | Example 14 | 5.0 | 293 |
| Comparative Example 12 | Raw particles 1 | 5.0 | 455 |
| Comparative Example 13 | Raw particles 2 | 5.0 | 321 |

TABLE 9-continued

| | | | |
|---|---|---|---|
| Comparative Example 14 | Raw particles 3 | 5.0 | 1,155 |
| Comparative Example 15 | Comparative Example 1 | 5.0 | 512 |
| Comparative Example 16 | Comparative Example 4 | 5.0 | 640 |
| Comparative Example 17 | Comparative Example 6 | 5.0 | 876 |

| | Properties of non-magnetic undercoat layer | | |
|---|---|---|---|
| Examples and Comparative Examples | Thickness ($\mu$m) | Gloss (%) | Surface roughness Ra (nm) |
| Example 25 | 3.5 | 206 | 6.4 |
| Example 26 | 3.5 | 203 | 6.2 |
| Example 27 | 3.5 | 198 | 6.2 |
| Example 28 | 3.4 | 207 | 6.0 |
| Example 29 | 3.5 | 205 | 6.0 |
| Example 30 | 3.4 | 200 | 5.8 |
| Comparative Example 12 | 3.5 | 193 | 7.0 |
| Comparative Example 13 | 3.6 | 192 | 8.1 |
| Comparative Example 14 | 3.5 | 180 | 12.2 |
| Comparative Example 15 | 3.6 | 194 | 7.0 |
| Comparative Example 16 | 3.6 | 192 | 7.2 |
| Comparative Example 17 | 3.6 | 186 | 7.9 |

| | Properties of non-magnetic undercoat layer | |
|---|---|---|
| Examples and Comparative Examples | Young's modulus (relative value) | Cyclohexanone dimer extraction amount (mg/m$^2$) |
| Example 25 | 138 | 10 |
| Example 26 | 141 | 8 |
| Example 27 | 146 | 13 |
| Example 28 | 139 | 8 |
| Example 29 | 142 | 8 |
| Example 30 | 144 | 11 |
| Comparative Example 12 | 121 | 60 |
| Comparative Example 13 | 123 | 70 |
| Comparative Example 14 | 125 | 90 |
| Comparative Example 15 | 122 | 52 |
| Comparative Example 16 | 121 | 42 |
| Comparative Example 17 | 120 | 55 |

TABLE 10

| | Production of magnetic recording medium | | |
|---|---|---|---|
| | Kind of non- | Magnetic particles | |
| Examples and Comparative Examples | magnetic undercoat layer | Kind | Amount blended (wt. part) |
| Example 31 | Example 25 | Example 8 | 100 |
| Example 32 | Example 26 | Example 9 | 100 |
| Example 33 | Example 27 | Example 10 | 100 |
| Example 34 | Example 28 | Example 11 | 100 |
| Example 35 | Example 29 | Example 16 | 100 |
| Example 36 | Example 30 | Example 8 | 100 |
| Example 37 | Example 25 | Example 8 | 100 |
| Example 38 | Example 26 | Example 16 | 100 |
| Example 39 | Example 25 | Raw particles 6 | 100 |
| Comparative Example 18 | Comparative Example 12 | Raw particles 6 | 100 |
| Comparative Example 19 | Comparative Example 13 | Comparative Example 3 | 100 |
| Comparative Example 20 | Comparative Example 14 | Comparative Example 3 | 100 |
| Comparative Example 21 | Comparative Example 15 | Comparative Example 3 | 100 |
| Comparative Example 22 | Comparative Example 16 | Comparative Example 3 | 100 |
| Comparative Example 23 | Comparative Example 17 | Comparative Example 3 | 100 |

| | Production of magnetic recording medium Filler | | Properties of coating |
|---|---|---|---|
| Examples and Comparative Examples | Kind | Amount blended (wt. part) | composition Viscosity (cP) |
| Example 31 | Raw particles 5 | 10 | 5,663 |
| Example 32 | Raw particles 5 | 7 | 2,912 |
| Example 33 | Raw particles 5 | 9 | 2,462 |
| Example 34 | Raw particles 5 | 6 | 4,836 |
| Example 35 | Raw particles 5 | 14 | 2,713 |
| Example 36 | Example 6 | 14 | 7,773 |
| Example 37 | Example 7 | 11 | 6,104 |
| Example 38 | Example 15 | 10 | 2,102 |
| Example 39 | Raw particles 5 | 10 | 9,802 |
| Comparative Example 18 | Raw particles 5 | 7 | 11,250 |
| Comparative Example 19 | Comparative Example 2 | 7 | 9,872 |
| Comparative Example 20 | Comparative Example 2 | 7 | 8,763 |
| Comparative Example 21 | Comparative Example 2 | 7 | 8,882 |
| Comparative Example 22 | Comparative Example 2 | 7 | 8,902 |
| Comparative Example 23 | Comparative Example 2 | 7 | 9,163 |

TABLE 11

| | Properties of magnetic recording medium | | |
|---|---|---|---|
| Examples and Comparative Examples | Thickness of magnetic layer ($\mu$m) | Coercive force value (kA/m) | Br/Bm (—) |
| Example 31 | 1.0 | 157.1 | 0.88 |
| Example 32 | 1.1 | 75.6 | 0.89 |
| Example 33 | 1.0 | 60.1 | 0.90 |
| Example 34 | 1.0 | 211.2 | 0.89 |
| Example 35 | 1.1 | 77.5 | 0.90 |
| Example 36 | 1.1 | 157.4 | 0.90 |
| Example 37 | 1.0 | 157.6 | 0.90 |
| Example 38 | 1.0 | 78.8 | 0.89 |
| Example 39 | 1.0 | 156.6 | 0.88 |
| Comparative Example 18 | 1.0 | 156.3 | 0.83 |
| Comparative Example 19 | 1.0 | 75.1 | 0.84 |
| Comparative Example 20 | 1.0 | 75.1 | 0.84 |
| Comparative Example 21 | 1.0 | 75.2 | 0.85 |
| Comparative Example 22 | 1.0 | 74.6 | 0.83 |
| Comparative Example 23 | 1.0 | 75.2 | 0.85 |

TABLE 11-continued

| Examples and Comparative Examples | Properties of magnetic recording medium | | |
|---|---|---|---|
| | Gloss (%) | Surface roughness Ra (nm) | Young's modulus (relative value) |
| Example 31 | 221 | 6.0 | 143 |
| Example 32 | 186 | 6.6 | 147 |
| Example 33 | 191 | 6.5 | 149 |
| Example 34 | 221 | 5.9 | 148 |
| Example 35 | 189 | 6.0 | 146 |
| Example 36 | 235 | 5.8 | 147 |
| Example 37 | 233 | 5.7 | 146 |
| Example 38 | 195 | 6.0 | 150 |
| Example 39 | 209 | 6.1 | 140 |
| Comparative Example 18 | 194 | 12.6 | 127 |
| Comparative Example 19 | 176 | 11.2 | 134 |
| Comparative Example 20 | 171 | 11.8 | 136 |
| Comparative Example 21 | 178 | 11.0 | 133 |
| Comparative Example 22 | 176 | 11.4 | 134 |
| Comparative Example 23 | 172 | 11.6 | 132 |

| Examples and Comparative Examples | Properties of magnetic recording medium | | |
|---|---|---|---|
| | Durability | | Cyclohexanone |
| | Running durability (min) | Scratch resistance (-) | dimer extraction amount (mg/m²) |
| Example 31 | ≧30 | A | 11 |
| Example 32 | ≧30 | A | 10 |
| Example 33 | ≧30 | A | 14 |
| Example 34 | ≧30 | A | 10 |
| Example 35 | ≧30 | A | 9 |
| Example 36 | ≧30 | A | 12 |
| Example 37 | ≧30 | A | 11 |
| Example 38 | ≧30 | A | 9 |
| Example 39 | 28.2 | A | 19 |
| Comparative Example 18 | 17.9 | B | 70 |
| Comparative Example 19 | 16.8 | C | 81 |
| Comparative Example 20 | 18.3 | C | 101 |
| Comparative Example 21 | 17.6 | C | 62 |
| Comparative Example 22 | 17.2 | C | 53 |
| Comparative Example 23 | 16.9 | C | 66 |

What is claimed is:

1. A magnetic recording medium comprising:
   a non-magnetic base film; and
   a magnetic recording layer formed on the non-magnetic base film, which contains a filler, a binder resin and surface-modified magnetic particles having an average particle diameter of 0.01 to 0.7 µm and comprising magnetic particles and an organosilane compound produced from a silane monomer, comprising an alkoxysilane represented by the formula (I):

$$R^1_a SiX_{4-a} \quad (I)$$

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3, the organosilane being coated on surface of the magnetic particle by means of a dry-mixing method.

2. A magnetic recording medium according to claim 1, wherein the alkoxysilane is selected from the group consisting of methyltriethoxysilane, dimethyldiethoxysilane, phenyltriethoxysilane, diphenyldiethoxysilane, dimethyldimethoxysilane, methyltrimethoxysilane, phenyltrimethoxysilane, diphenyldimethoxysilane, isobutyltrimethoxysilane and decyltrimethoxysilane.

3. A magnetic recording medium according to claim 1, wherein the amount of the organosilane compound coat is usually 0.04 to 15% by weight, calculated as Si, based on the weight of the surface-modified magnetic particles.

4. A magnetic recording medium according to claim 1, wherein the surface-modified magnetic particles have a fatty acid adsorption of not more than 16 mg/g.

5. A magnetic recording medium according to claim 1, which further have a cyclohexanone dimer extraction amount of not more than 50 mg/m².

6. A magnetic recording medium according to claim 1, wherein the filler is a surface-modified filler having an average particle diameter of 0.01 to 1.0 µm and comprising a filler and an organosilane compound produced from a silane monomer, coated on surface of the non-magnetic particle by means of a dry-mixing method.

7. A magnetic recording medium according to claim 6, wherein the alkoxysilane is selected from the group consisting of methyltriethoxysilane, dimethyldiethoxysilane, phenyltriethoxysilane, diphenyldiethoxysilane, dimethyldimethoxysilane, methyltrimethoxysilane, phenyltrimethoxysilane, diphenyldimethoxysilane, isobutyltrimethoxysilane and decyltrimethoxysilane.

8. A magnetic recording medium according to claim 6, wherein the amount of the organosilane compound coat is usually 0.04 to 15% by weight, calculated as Si, based on the weight of the surface-modified filler.

9. A magnetic recording medium according to claim 6, wherein the surface-modified filler has a fatty acid adsorption of not more than 7 mg/g.

10. A magnetic recording medium according to claim 6, which further have a cyclohexanone dimer extraction amount of not more than 49 mg/m².

11. A magnetic recording medium according to claim 1, which further comprises a non-magnetic undercoat layer disposed between the surface of the non-magnetic base film and the magnetic recording layer, which contains a binder resin, and non-magnetic particles.

12. A magnetic recording medium according to claim 11, wherein said non-magnetic particles are surface-modified non-magnetic particles having an average particle diameter of 0.01 to 0.5 µm and comprising acicular non-magnetic particles and an organosilane compound produced from a silane monomer, coated on surface of the acicular non-magnetic particle by means of a dry-mixing method.

13. A magnetic recording medium according to claim 12, wherein the alkoxysilane is selected from the group consisting of methyltriethoxysilane, dimethyldiethoxysilane, phenyltriethoxysilane, diphenyldiethoxysilane, dimethyldimethoxysilane, methyltrimethoxysilane, phenyltrimethoxysilane, diphenyldimethoxysilane, isobutyltrimethoxysilane and decyltrimethoxysilane.

14. A magnetic recording medium according to claim 12, wherein the amount of the organosilane compound coat is usually 0.04 to 15% by weight, calculated as Si, based on the weight of the surface-modified non-magnetic particles.

15. A magnetic recording medium according to claim 12, wherein the surface-modified non-magnetic particles have a fatty acid adsorption of not more than 15 mg/g.

16. A magnetic recording medium according to claim 12, which further have a cyclohexanone dimer extraction amount of not more than 44 mg/m².

17. A magnetic recording medium according to claim 1, wherein the filler is a surface-modified filler having an average particle diameter of 0.01 to 1.0 μm and comprising a filler and an organosilane compound produced from a silane monomer, coated on surface of the filler by means of a dry-mixing method; and which further comprises a non-magnetic undercoat layer disposed between the surface of the non-magnetic base film and the magnetic recording layer, which contains a binder resin, and surface-modified non-magnetic particles having an average particle diameter of 0.01 to 0.5 μm and comprising acicular non-magnetic particles and an organosilane compound produced from a silane monomer, coated on surface of the acicular non-magnetic particle by means of a dry-mixing method.

18. A magnetic recording medium according to claim 17, which further have a cyclohexanone dimer extraction amount of not more than 43 mg/m².

19. A magnetic recording medium comprising:

a non-magnetic base film; and a magnetic recording layer formed on the non-magnetic base film, which contains magnetic particles, a binder resin, and a surface-modified filler having an average particle diameter of 0.01 to 1.0 μm and comprising a filler and organosilane compound produced from a silane monomer, comprising an alkoxysilane represented by the formula (I):

$$R^1_a SiX_{4-a} \qquad (I)$$

wherein $R^1$ is $C_6H_5-$, $(CH_3)_2CHCH_2-$ or $n-C_bH_{2b+1}-$ (wherein b is an integer of 1 to 18); X is $CH_3O-$ or $C_2H_5O-$; and a is an integer of 0 to 3, the organosilane being coated on the surface of the filler by means of a dry-mixing method.

* * * * *